(12) United States Patent
Satoyama et al.

(10) Patent No.: US 7,356,658 B2
(45) Date of Patent: Apr. 8, 2008

(54) SNAPSHOT SYSTEM

(75) Inventors: Ai Satoyama, Sagamihara (JP);
Yoshiaki Eguchi, Yokohama (JP);
Takahiro Nakano, Yokahama (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 10/998,755

(22) Filed: Nov. 30, 2004

(65) Prior Publication Data

US 2006/0075200 A1 Apr. 6, 2006

(30) Foreign Application Priority Data

Oct. 6, 2004 (JP) ............... 2004-293464

(51) Int. Cl.
*G06F 12/16* (2006.01)
(52) U.S. Cl. .................. 711/162; 707/204
(58) Field of Classification Search ............. 711/162; 707/204
See application file for complete search history.

(56) References Cited

U.S. PATENT DOCUMENTS

| | | | |
|---|---|---|---|
| 5,649,152 A | 7/1997 | Ohran et al. | |
| 6,694,413 B1 * | 2/2004 | Mimatsu et al. ............. | 711/162 |
| 7,181,583 B2 * | 2/2007 | Saika ......................... | 711/162 |
| 2003/0131207 A1 | 7/2003 | Arakawa et al. | |
| 2003/0188116 A1 * | 10/2003 | Suzuki et al. ................ | 711/162 |
| 2004/0093474 A1 | 5/2004 | Lin et al. | |
| 2004/0168034 A1 | 8/2004 | Homma et al. | |
| 2005/0198083 A1 * | 9/2005 | Saika et al. ................... | 707/204 |
| 2005/0210193 A1 * | 9/2005 | Nagata ........................ | 711/114 |
| 2005/0216535 A1 * | 9/2005 | Saika et al. .................. | 707/204 |
| 2006/0031637 A1 * | 2/2006 | Komikado et al. .......... | 711/114 |
| 2007/0005886 A1 * | 1/2007 | Nagata ........................ | 711/114 |

FOREIGN PATENT DOCUMENTS

| EP | 1 148 416 | 10/2001 |
|---|---|---|
| JP | 2002-278819 | 9/2002 |

* cited by examiner

*Primary Examiner*—Jack Lane
(74) *Attorney, Agent, or Firm*—Antonelli, Terry, Stout & Kraus, LLP.

(57) ABSTRACT

To obtain a volume image of a given generation. A storage system of this invention includes a disk device in which an original volume is provided to read/write data from a host, a copy volume is provided to store a copy of the original volume of a predetermined timing, and a snapshot volume is provided to store snapshot data of a snapshot of the original volume; and a storage control unit which includes a management unit for controlling the storage control unit, a channel I/F connected to the host, and a device I/F connected to the disk device, in which the management unit copies data of the original volume to the copy volume at a predetermined timing, stores the snapshot data of the snapshot in the snapshot volume corresponding to a write request in the original volume, manages a generation of the created snapshot and a generation of the copy volume, and reads data from at least one of the snapshot volume and the copy volume when a read request from a volume of a generation different from that of the original volume is received from the host.

15 Claims, 17 Drawing Sheets

| ORIGINAL VOLUME BLOCK ADDRESS | GENERATION MANAGEMENT BITMAP | VIRTUAL VOLUME 1 (GENERATION 1) | VIRTUAL VOLUME 2 (GENERATION 2) | ... | VIRTUAL VOLUME n (GENERATION n) | |
|---|---|---|---|---|---|---|
| 0 | 00...0 | 0 | 0 | ... | 0 | 2616 |
| 1 | 00...1 | 1 | 2 | ... | NONE | 2617 |
| 2 | 11...1 | NONE | NONE | ... | NONE | 2618 |
| ⋮ | ⋮ | ⋮ | ⋮ | | ⋮ | |
| m−1 | 11...1 | NONE | NONE | ... | NONE | 2619 |

FIG. 2A

| SNAPSHOT VOLUME BLOCK ADDRESS | GENERATION ASSIGNMENT BITMAP | |
|---|---|---|
| 0 | 11...1 | 2623 |
| 1 | 10...0 | 2624 |
| 2 | 01...0 | 2625 |
| ⋮ | ⋮ | |
| p−1 | 00...0 | 2626 |

FIG. 2B

SNAPSHOT SYSTEM

CLAIM OF PRIORITY

The present application claims priority from Japanese application P2004-293464 filed on Oct. 6, 2004, the content of which is hereby incorporated by reference into this application.

BACKGROUND OF THE INVENTION

This invention relates to a storage system for obtaining a snapshot of a volume image in a computer system which uses a storage, and more particularly to obtaining of an image of an optional generation volume.

In an information-oriented society, one of the important roles of the storage system that stores information is data protection. A most common method of data protection is so-called backup which stores data of the storage in a backup medium such as a tape library. In the backup, even if data of the operated storage system is lost due to a failure, interference, an operation mistake, or the like, the data of the stored time can be recovered by restoring backup data, whereby damage can be limited to a minimum.

However, a larger capacity of the storage is accompanied by an increase in time necessary for backup. Additionally, in use of high data updating frequency, a difference from the backup data is shortly increased even when the data is backed up once. Thus, backup data must be frequently generated in case that damage will increase. To deal with a file loss caused by an operation mistake or the like, or to prepare for comparison of file contents with a past state, there is a wish to easily refer to data which is periodically backed up.

A snapshot has been a focus of attention as a function to meet such use. The snapshot stores an image of data of the storage operated at the time. The snapshot image can be accessed as a volume different from that of the operated storage.

As the snapshot function, there has been presented a generation management method of a snapshot image in which a data holding unit 1 executes normal reading, a data holding unit 2 stores a snapshot image of the data holding unit 1 at a given time, a data holding unit 3 stores history information containing update data which accompanies data rewriting in the data holding unit 1 after the time of storing the snapshot image in the data holding unit 2, information indicating a generation thereof, and information indicating an update area thereof, and a data reading source selection unit refers to each history information stored in the data holding unit 3 to obtain a store location of a snapshot image to be read according to designation of a generation and an area of the snapshot image to be read, and switches data reading source to one of the data holding unit 2 and the data holding unit 3 according to the store location (e.g., JP 2002-278819 A).

SUMMARY OF THE INVENTION

The snapshot function stores snapshot information only of an original volume. Thus, many snapshots must be stored to store many generations, consequently increasing a storage capacity.

On the other hand, backup data of many generations can be stored in the tape library. However, the tape library is only suited to storage of data of low access frequency because an access speed is generally very slow. Thus, the tape library is not suited to requested high-speed accessing or restoring of data of many generations. Backup data is preferably stored in a storage control unit.

This invention has been made with the foregoing problems in mind, and it is an object of this invention to provide a storage system which can store backup data of many generations in a storage of a storage control unit, and access and restore the data.

According to an embodiment of this invention, there is provided a storage system including: a disk device which includes: an original volume from/to which data is read/written by a host; a copy volume for storing a copy of the original volume of a predetermined timing; and a snapshot volume for storing snapshot data of a snapshot of the original volume; and a storage control unit which includes: a management unit for controlling the storage control unit; a channel I/F that is connected to the host; and a device I/F that is connected to the disk device, wherein the management unit copies data of the original volume to the copy volume by a predetermined timing, stores the snapshot data of the snapshot in the snapshot volume corresponding to a write request in the original volume, manages a generation of the created snapshot and a generation of the copy volume, and reads data from at least one of the snapshot volume and the copy volume when a read request from a volume of a generation different from that of the original volume is received from the host.

According to an embodiment of this invention, it is possible to obtain optional volumes of a plurality of generations by storing the snapshot volume and the copy volume.

BRIEF DESCRIPTION OF THE DRAWINGS

FIG. 2A is an explanatory diagram showing a snapshot management table of a snapshot bitmap according to the first embodiment of this invention.

FIG. 2B is an explanatory diagram showing a snapshot block management table of the snapshot bitmap according to the first embodiment of this invention.

DETAILED DESCRIPTION OF THE PREFERRED EMBODIMENTS

Hereinafter, preferred embodiments of this invention will be described with reference to the accompanying drawings.

Figure 1:
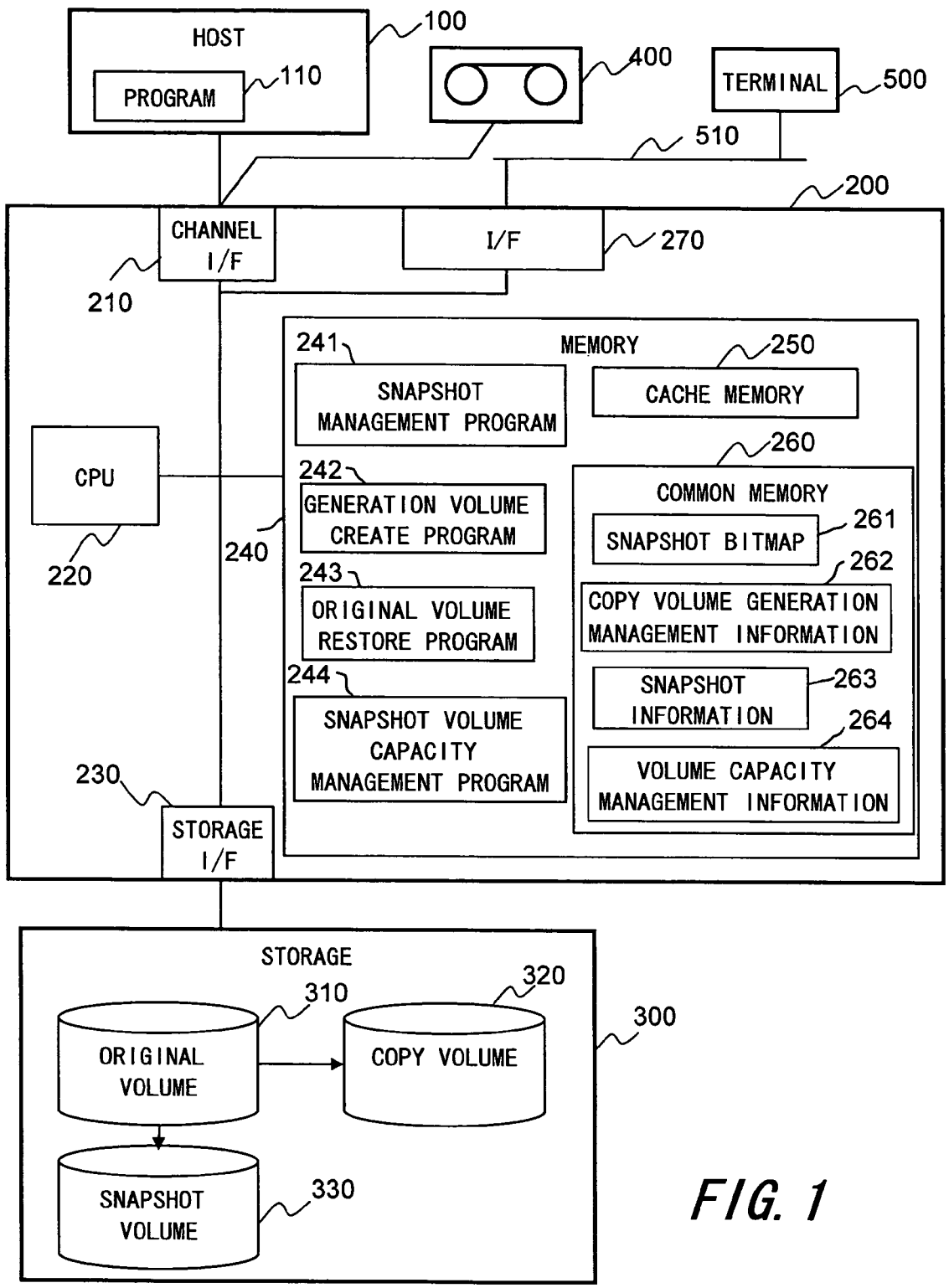
FIG. 1 is a block diagram showing a configuration of a storage system according to a first embodiment of this invention.

FIG. 1 is a block diagram showing a configuration of a storage system.

A storage control unit 200 provides file share services to a host 100 connected through a channel interface (channel I/F) 210.

The storage control unit 200 includes a channel I/F 210, a CPU 220, a device interface (device I/F) 230, and a memory 240.

The channel I/F 210 is connected to the host 100 through a network to transmit/receive a predetermined signal (command, data).

The device I/F 230 transmits/receives a signal (command, data) based on Small Computer System Interface (SCSI) with a storage 300.

The storage 300 includes a plurality of disk devices, which are divided into three logical areas (logical volumes), i.e., an original volume 310, a copy volume 320, and a snapshot volume 330.

The original volume 310 is a logical volume from/in which data is read/written based on a request from the host 100. The copy volume 320 functions as a backup to store a full copy of the original volume 310 of a given time. The snapshot volume 330 stores a snapshot of the original volume 310.

The memory 240 stores a snapshot management program 241, a generation volume create program 242, an original volume restore program 243, and a snapshot volume capacity management program 244. The CPU 220 loads and executes these programs to managing the storage unit.

The memory 240 includes a cache memory 250 and a common memory 260. The cache memory 250 functions as a cache when data is written/read in/from the storage 300. The common memory 260 stores control information or the like used for various operations of the storage control unit 200. The common memory 260 stores a snapshot bitmap 261, a copy volume generation management information 262, snapshot information 263, volume capacity management information 264, and the like.

The snapshot bitmap 261 includes a snapshot management table 2610 and a snapshot block management table 2620 (described later). The copy volume generation management information 262 registers information regarding which generation data copied in the copy volume 320 belong to. The snapshot information 263 registers information regarding a time of storing a snapshot in the snapshot volume 330 and a generation thereof. The volume capacity management information 264 registers information regarding a use capacity of a snapshot volume of each generation, a last access date and time, and access frequency.

Upon reception of a snapshot creation request from the host 100, the snapshot management program 241 creates a snapshot of the original volume 310 of the storage control unit 200. In the snapshot creation process, by using the snapshot management table 2610 (described later), the snapshot management program 241 manages data stored in the original volume 310 and the snapshot volume 330 to enable access to the data stored in the original volume 310 at the time of receiving the snapshot creation request. Accordingly, access can be made to a virtual volume for providing the created snapshot of the original volume 310.

The virtual volume includes storage areas in one or a plurality of disk devices. In reality, the virtual volume includes a block in the original volume 310 and a block in the snapshot volume 330.

The snapshot management program 241 manages a volume (snapshot volume 330) which stores snapshot data necessary for maintaining the snapshot in addition to a volume (original volume 310) which stores a file system, and executes a data input/output process, a process of maintaining the snapshot or a process of making the snapshot usable according to a request from the host 100.

Specifically, the snapshot management program 241 receives the snapshot creation request. The snapshot management program 241 that has received the creation request first registers identification information of a new virtual volume in the snapshot management table 2610 (described later). A block of the virtual volume is correlated one by one to a block of the original volume 310 initially based on the snapshot management table 2610. However, when data in the original volume 310 is updated thereafter, the snapshot management program 241 copies the data before updating from the original volume 310 to the snapshot volume as described later, and updates stored data of the original volume 310 after the copying. Then, the snapshot management program 241 updates the snapshot management table 2610 to correlate the block of the virtual volume corresponding to the data-updated block of the original volume 310 to a block of the snapshot volume which has stored the data stored in the original volume 310 at the time of receiving the snapshot creation request (i.e., data before updating).

The snapshot management program 241 receives an access request the virtual volume from the host 100. The snapshot management program 241 that has received the access request refers to the snapshot management table 2610 to instruct the host 100 to access the block of the original volume 310 or the block of the snapshot volume 330 correlated to the block of the virtual volume. Accordingly, the host 100 can obtain information of the original volume 310 at the time of the snapshot creation request by accessing the virtual volume. Thus, the storage control unit 200 can provide a snapshot image of the file system.

The operations will be described in detail later.

The storage 300 may use a plurality of independent physical disk drives, or physically divide one disk drive by logical division. Alternatively, the storage 300 may be a logical volume which includes a plurality of disk devices and which is logically set as one disk. Otherwise, a RAID device may include a plurality of physical disk drives which constitute a logical volume.

The tape library 400 stores the copy of the data stored in the storage 300 connected to the storage control unit 200.

The tape library 400 is connected through the channel I/F 210 to the storage control unit 200.

The host 100 includes a program 110. The storage control unit 200 includes an I/F 270. The I/F 270 is connected to a terminal 500 through a LAN 501. For example, the I/F 270 includes an SCSI interface.

A user can send instructions to the storage control unit 200 by the program 110 of the host 100.

The user can also send instructions to the storage control unit 200 from the terminal 500.

FIGS. 2A and 2B are explanatory diagrams of the snapshot bitmap 261.

The snapshot bitmap 261 includes the snapshot management table 2610 shown in FIG. 2A and the snapshot block management table 2620 shown in FIG. 2B.

The snapshot management table 2610 shown in FIG. 2A includes an original volume block address 2611, a generation management bitmap 2612, and a virtual volume generation access table.

A column 2611 registers block addresses of the original volume 310. A 1st block address No. 0 of the original volume 310 is allocated to a first line (1st line), a block address No. 1 of the original volume is allocated to a 2nd line, block addresses of the original volume 310 are allocated sequentially thereafter, and a block address No. (m−1) of the original volume 310 is allocated to an m-th line which is a last line.

A column 2612 is a generation management bitmap, which indicates whether there is snapshot data or not corresponding to the original volume block address. Details will be described later.

Columns 2613 to 2615 register data store locations corresponding to block addresses of virtual volumes of generations. For example, the column 2613 registers a data store location of a snapshot No. 1 (generation 1). In this case, the snapshot number and the virtual volume number are identical, and the number indicates a generation. For example, a virtual volume 1 corresponds to a snapshot No. 1, and a generation of the virtual volume 1 is "1".

A 1st line of the column 2613 registers information for identifying a storage area in which data corresponding to a block address No. 0 of the virtual volume 1 of the generation 1 is stored. Sequentially thereafter, a 2nd line registers a data store location corresponding to a block address No. 1 of the virtual volume 1, a 3rd line registers a data store location corresponding to a block address No. 2, and the like.

More specifically, No. 0 registered as the data store location of the block address No. 0 of the virtual volume 1 in the 1st line corresponds to a block address No. 0 of the snapshot volume 330.

The snapshot management program 241 receives a snapshot creation request. When data of the block address No. 0 of the original volume 310 is updated, the snapshot management program 241 that has received the creation request writes data before updating stored in the block address No. 0 of the original volume 310 in the block address No. 0 of the snapshot volume 330. Subsequently, the data of the block address No. 0 of the original volume 310 is updated. It is because the data stored in the original volume 310 at the time of receiving the snapshot creation request must be stored in one of the storage areas in the disk device to provide access to the snapshot.

As described above, in the snapshot management table 2610, the block address No. 0 of the virtual volume 1 is correlated to the block address No. 0 of the snapshot volume 330. The snapshot management program 241 can obtain the data before updating of the block address No. 0 of the original volume 310, i.e., the virtual volume of the generation 1, by accessing the 1st-line block address No. 0 of the virtual volume 1, i.e., the block address No. 0 of the snapshot volume 330.

Accordingly, upon reception of an access request the block address No. 0 of the virtual volume 1 of the generation 1, the snapshot management program 241 refers to the snapshot management table 2610 to access the block address No. 0 of the snapshot volume 330. As a result, the snapshot management program 241 can provide, to the host 100, an environment of access to the virtual volume 1 of the generation 1 in a state similar to that in which the data before updating of the block address No. 0 of the original volume 310, i.e., the data of the generation 1 stored in the block address No. 0 of the original volume 310 at the time of receiving the snapshot creation request, has been written in the block address No. 0 of the virtual volume 1.

Similarly, No. 1 registered as a data store location of the block address of the virtual volume 1 of the generation 1 in the 2nd line corresponds to a block address No. 1 of the snapshot volume 330. When data of the block address No. 1 of the original volume 310 is updated after the reception of the snapshot creation request, the snapshot management program 241 writes data before updating of the block address No. 1 of the original volume 310 in the block address No. 1 of the snapshot volume 330. Subsequently, the data of the block address No. 1 of the original volume 310 is updated. Thus, in the snapshot management table 2610, the block address No. 1 of the virtual volume 1 of the generation 1 is correlated to the block address No. 1 of the snapshot volume 330. The snapshot management program 241 can provide, to the host 100, access to the virtual volume 1 of the generation 1 in a state similar to that in which the data before updating of the block address No. 1 of the original volume 330, i.e., the data of the generation 1, has been written in the block address No. 1 of the virtual volume 1.

In the 3rd to the m-th line, "NONE" is registered as store location information corresponding to data of the block addresses No. 2 to No. (m−1)-th of the virtual volume 1. The "NONE" indicates a block address corresponding to the original volume 310. Thus, block addresses No. 2 to No. (m−1)-th of the original volume 310 correspond to the block addresses No. 2 to No. (m−1)-th of the virtual volume 1. In other words, the "NONE" indicates that a relevant block of the original volume 310 has not been updated (rewritten) after the last reception of the snapshot creation request.

As a result, the snapshot management program 241 can provide a snapshot image of the original volume 310 at a time before the updating of the data of the block addressees Nos. 0 and 1 of the original volume 310, i.e., the virtual volume 1 of the generation 1, based on the data of the block address No. 0 of the virtual volume 1, the data of the block address No. 1 of the virtual volume 1, and the data of the block addresses No. 2 to No. (m−1)-th of the original volume 310.

The column 2614 registers a data store location of a virtual volume 2 of a generation 2.

Each time the snapshot management program 241 receives the snapshot creation request, the snapshot management program 241 registers a virtual volume of a new generation in the snapshot management table to obtain a snapshot at the time of receiving the creation request. The virtual volume 2 is of a generation corresponding to a snapshot of a snapshot No. 2 (generation 2) created by the snapshot management program 241 when a snapshot creation request (snapshot creation request of generation 2) is received again after the creation of the snapshot of the snapshot No. 1 (corresponding to the virtual volume 1 of the generation 1).

No. 0 registered as the data store location of the block address No. 0 of the virtual volume 2 in the 1st line of the column 2614 corresponds to a block address No. 0 of the snapshot volume 330.

The snapshot management program 241 receives a second snapshot creation request. When data of the block address No. 0 of the original volume 310 is updated, the snapshot management program 241 that has received the creation request copies the data before updating stored in the block address No. 0 of the original volume 310 in the block address No. 0 of the snapshot volume 330 as described above. Subsequently, the data of the block address No. 0 of the original volume 310 is updated. Then, the snapshot management program 241 rewrites the snapshot management table 2610 to store data corresponding to the block addresses Nos. 0 of the virtual volume 1 and the virtual volume 2 in the block address No. 0 of the snapshot volume 330, and to correlate the block addresses Nos. 0 of the virtual volume 1 and the virtual volume 2 to the block address No. 0 of the snapshot volume 330.

No. 2 registered as a data store location of the block address No. 1 of the virtual volume 2 in the 2nd line of the column 2614 corresponds to a block address No. 2 of the snapshot volume 330. It indicates that after the snapshot management program 241 receives the second snapshot creation request, the data of the block address No. 1 of the original volume 310 is updated. In other words, for the data updating of the block address No. 1 of the original volume 310 after the reception of the second (generation 2) snapshot, the data before updating has been copied to the block address No. 2 of the snapshot volume 330. It is because copying to the block address No. 1 of the snapshot volume 330 causes a change in the data correlated to the block address No. 1 of the virtual volume 1, destroying the first snapshot data.

In the 3rd to the m-th line of the column 2614, "NONE" is registered as store location information of data of the block addresses No. 2 to No. (m-1)-th of the virtual volume 2. As described above, the "NONE" indicates that the block address of the virtual volume is correlated to a corresponding nonupdated block address of the original volume 310.

The virtual volume n is similar to the virtual volumes 1 and 2, and thus description thereof will be omitted.

The column 2612 is a generation management bitmap. A bit number thereof is equal to the number of virtual volumes. In the case of FIG. 2A, a generation management bitmap has n bits as the number of virtual volumes is n. A 1st bit of the generation management bitmap corresponds to the virtual volume 1 of the generation 1, a 2nd bit corresponds to the virtual volume 2 of the generation 2, and similarly thereafter an n-th bit corresponds to the virtual volume n of the generation n. When there is updating registration in a k-th line block address of the virtual volume, i.e., when the block address of the snapshot volume 330 has been registered, a bit corresponding to the virtual volume in the k-th line generation management bitmap is set to "0". On the other hand, when there is no updating registration in the k-th line block address of the virtual volume, i.e., when "NONE" has been registered, a bit corresponding to the virtual volume in the k-th line generation management bitmap is set to "1".

In the snapshot management table 2610 shown in FIG. 2A, bits of the 1st-line generation management bitmap all become "0", as "0" is allocated to the 1st-line block address No. 0 of each virtual volume. Bits of the m-th line generation management bitmap all become 1 as "NONE" is allocated to the m-th line block address No. (m-1) of each virtual volume.

In the snapshot management table 2610 shown in FIG. 2A, a size of the original volume 310 is m blocks, and a maximum number of snapshots is n. For example, when a block size is 512 bytes, a size of the original volume 310 is 128 gigabytes, and a maximum number of snapshots is 64, a size m of the original volume is 250,000,000 blocks, and a maximum number n of snapshots is 64. A block size, a size of the original volume 310, and a maximum number of snapshots may be optionally set because of no influence on effects of this invention.

In the snapshot management table 2610 shown in FIG. 2A, in the 1st line (line 2616), the column 2611 indicates a block address No. 0 of the original volume 310. The column 2612 indicates that the generation management bitmap is 00 . . . 0. "0", of the columns 2613 to 2615 indicates data of the block address No. 0 of virtual volumes 1, 2, . . . n corresponding to snapshots 1, 2, . . . n, i.e., that at the time of issuing a snapshot creation request corresponding to each virtual volume, data stored in the block address No. 0 of the original volume 310 has been stored in the block address No. 0 of the snapshot volume 330.

In the 2nd line (line 2617), the column 2611 indicates a block address No. 1 of the original volume 310. The column 2612 indicates that the generation management bitmap is 00 . . . 1. "1" of the column 2613 indicates that data of a block address No. 1 of the virtual volume 1 corresponding to the snapshot No. 1 have been stored in a block address No. 1 of the snapshot volume 330. "2" of the column 2614 indicates that data of a block address No. 1 of the virtual volume 2 corresponding to the snapshot No. 2 have been stored in a block address No. 2 of the snapshot volume 330. "NONE" of the column 2614 indicates that data of a block address No. 1 of the virtual volume n corresponding to the snapshot n have been stored in the block address No. 1 of the original volume 310.

Allocation of "NONE" to the block address No. 1 of the virtual volume n indicates that data of the block address No. 1 of the virtual volume n of the generation n have been stored in the block address No. 1 of the original volume 310, and the data of the block address No. 1 of the original volume 310 has not been updated after reception of an n-th snapshot creation request corresponding to the virtual volume n.

In the 3rd line (line 2618), the column 2611 indicates a block address No. 2 of the original volume 310. The column 2612 indicates that the generation management bitmap is 11 . . . 1. The columns 2613, 2614, . . . 2615 indicate that data of a block address No. 2 of the virtual volumes 1, 2, . . . n corresponding to the snapshots Nos. 1, 2, . . . n have been stored in a block address No. 2 of the original volume 310 (i.e., that the original volume 310 has not been updated).

In the m-th line (line 2619), the column 2611 indicates a block address No. (m-1) of the original volume 310. The column 2612 indicates that the generation management bitmap is 11 . . . 1. The columns 2613, 2614, . . . 2615 indicate that data of a block address No. (m-1) of the virtual volumes 1, 2, . . . n corresponding to the snapshots Nos. 1, 2, . . . n have been stored in a block address No. (m-1) of the original volume 310 (i.e., that the original volume 310 has not been updated (rewritten)).

In other words, the generation management bitmap indicated in each entry of the column 2612 is a storage area which includes at least n bits indicating a maximum number of snapshots, each bit corresponds to a snapshot number, and presence of updating after a start of maintaining a snapshot is indicated. In FIGS. 2A and 2B, "0" means updating while "1" means no updating.

The generation management bitmap 2612 is referred to when the snapshot management program 241 writes block data in the original volume 310, and used to determine whether or not to copy data before updating of an address in which the data is written to the snapshot volume 330. The generation management bitmap eliminates the necessity of referring to all the data in the snapshot management table 2610 to know a snapshot of a virtual volume whose block address is rewritten for each data writing, whereby a data writing speed is increased.

FIG. 2B shows the snapshot block management table 2620.

The snapshot block management table 2620 shows correspondence between a snapshot volume block address 2621 and a generation assignment bitmap 2622 to each block disposed in the snapshot volume 330 to manage a block use situation of the snapshot volume 330.

The generation assignment bitmap 2622 of each column is a storage area which includes at least n bits indicating a maximum number of snapshot creations, and each bit corresponds to a number (generation number) of a snapshot. Each bit indicates whether a corresponding block on the snapshot volume 330 is referred to or not ("1" means reference while "0" means no reference) as a block which constitutes a virtual volume to access corresponding snapshot data.

When block data of the original volume 301 is copied to the snapshot volume 330 after writing executed in the original volume 310 based on a request from the host 100, a bit in the generation assignment bitmap 2622 corresponding to the snapshot number to refer to the block is updated to 1. When a free block is obtained from the snapshot volume 330, a block in which the bits of the generation assignment bitmap 2622 are all 0 is selected.

When a snapshot is deleted, for all the blocks which constitute a virtual volume corresponding to the snapshot to be deleted, a bit in the assignment bitmap corresponding to the snapshot to be deleted is updated to "0".

Data of the snapshot block management table 2620 shown in FIG. 2B will be described. A 1st line (2623) registers all "11 . . . 1" as an assignment bitmap of a block address No. 0 of the snapshot volume 330, which indicates that a block of the block address No. 0 of the snapshot volume 330 is used for all snapshots. As defined in the 1st line (2616) of the snapshot management table 2610 shown in FIG. 2A, data of a block address No. 0 of virtual volumes 1, 2, . . . n corresponding to snapshots 1, 2, . . . n are stored in the block address 0 of the snapshot volume 330.

A 2nd line (2624) registers "10 . . . 0" as an assignment bitmap of a block address No. 1 of the snapshot volume 330, which indicates that a block of the block address No. 1 of the snapshot volume 330 is used for a snapshot No. 1 corresponding to a 1st bit of the assignment bitmap, i.e., constitutes a virtual volume 1, but it is not used for the other snapshots. As defined in the 2nd line (2617) of the snapshot management table 2610 shown in FIG. 2A, data of a block address No. 1 of the virtual volume 1 corresponding to the snapshot No. 1 are stored in the block address No. 1 of the snapshot volume 330.

A 3rd line (2625) registers "01 . . . 0" as an assignment bitmap of a block address No. 2 of the snapshot volume 330, which indicates that a block of the block address No. 2 of the snapshot volume 330 is used for a snapshot No. 2 corresponding to a 2nd bit of the assignment bitmap, i.e., constitutes a virtual volume 2. As defined in the 3rd line (2618) of the snapshot management table 2610 shown in FIG. 2A, data of a block address No. 1 of the virtual volume 2 corresponding to the snapshot No. 2 are stored in the block address No. 2 of the snapshot volume 330.

Thereafter, setting is similar until a (p–1)-th line (2626).

That is, when at least one bit of the assignment bitmap 2622 is "1", a relevant block of the snapshot volume 330 is used for a snapshot. When all the bits of the assignment bitmap 2622 are "0", the block of the snapshot volume 330 is not used for the snapshot. In other words, it is a free block.

Next, the process of the snapshot management program 241 will be described.

Figure 3:
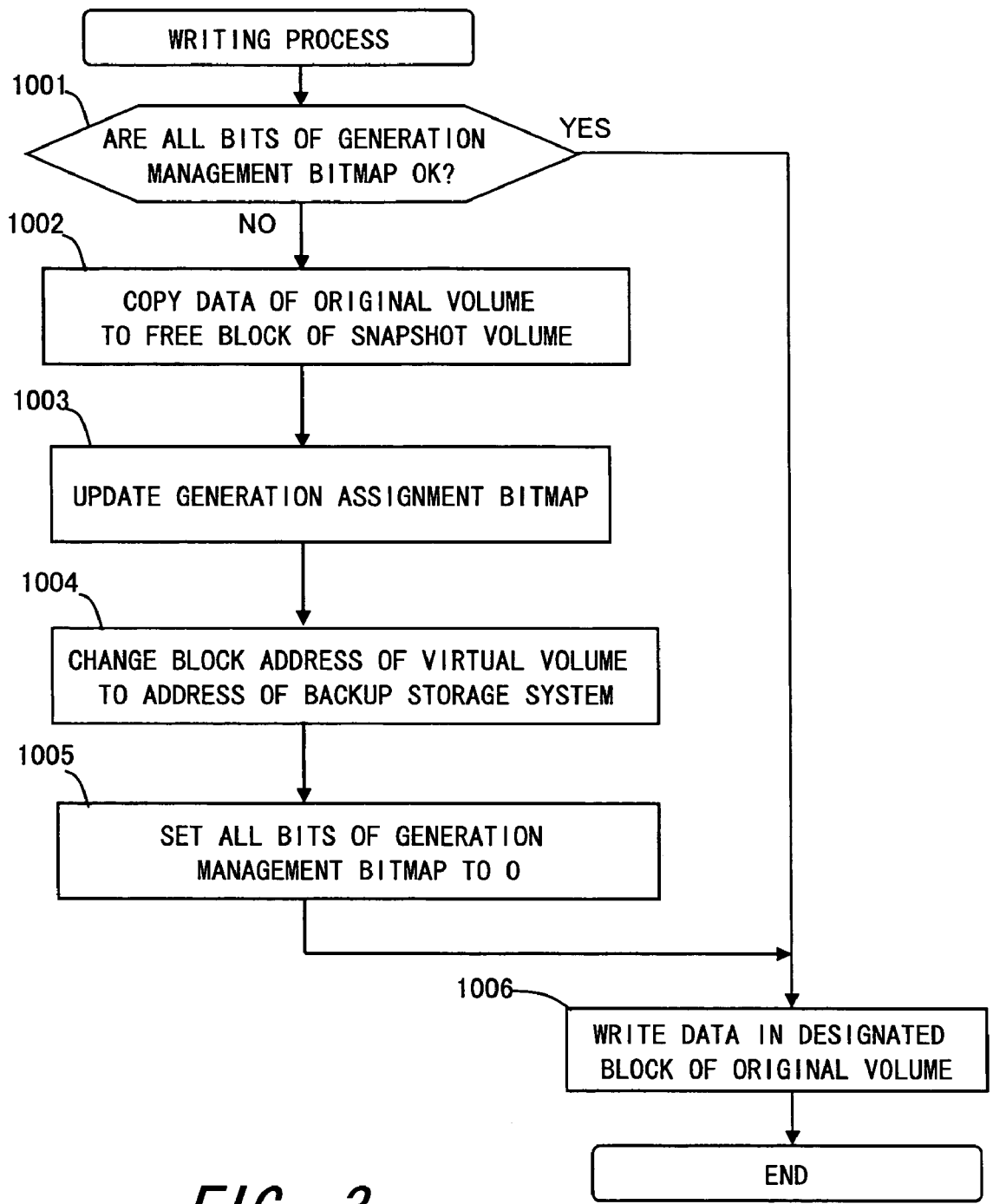
FIG. 3 is a flowchart of a writing process according to the first embodiment of this invention.

FIG. 3 is a flowchart showing a writing process executed by the snapshot management program 241.

The snapshot management program 241 first refers to the snapshot management table 2610 to determine whether all the bits of the generation management bitmap 2612 corresponding to a block address of a writing process target are "0" or not (1001).

If all the bits are "0", data of the block has been updated after issuance of a last snapshot creation request, and virtual volumes have all been correlated to the snapshot volume 330 for the block. Thus, when all the bits of the generation management bitmap 2612 are "0", it is not necessary to copy data before updating to the snapshot volume 330. Then, proceeding to a step 1006, the data is written in a designated block of the original volume 310.

On the other hand, if at least one bit is "1", there is a snapshot (virtual volume) which refers to the data of the original volume 310 to be updated by the writing process, and thus the process proceeds to a step 1002.

In the step 1002, reference is made to the snapshot block management table 2620 shown in FIG. 2B to copy the data before updating stored in the original volume 310 to be updated by the writing process to a free block of the snapshot volume 330.

Then, a value of the generation management bitmap referred to in the step 1001 is stored in the generation assignment bitmap 2622 of the snapshot block management table 2620 corresponding to an address of the free block of the snapshot volume 330 set as a secondary side of the data copying in the step 1002 (1003).

Subsequently, among the virtual volumes registered in the snapshot management table 2610, a virtual volume corresponding to a bit having a value "1" of the generation management bitmap referred to in the step 1001 is specified. Then, the snapshot management table 2610 is updated so that a block corresponding to a writing target block of the specified virtual volume can correspond to the snapshot volume 330 set as the secondary data copying side in the step 1002 (1004). In other words, the address of the block of the snapshot volume 330 set as the secondary data copying side in the step 1002 is registered in a line corresponding to the writing target block address in a column corresponding to the specified virtual volume of the snapshot management table 2610.

Next, values of all the bits of the generation management bitmap referred to in the step 1001 are updated to "0" (1005).

Next, designated data is written in the block of the original volume 310 indicated by the designated block address (1006). Then, the process comes to an end.

Figure 4:
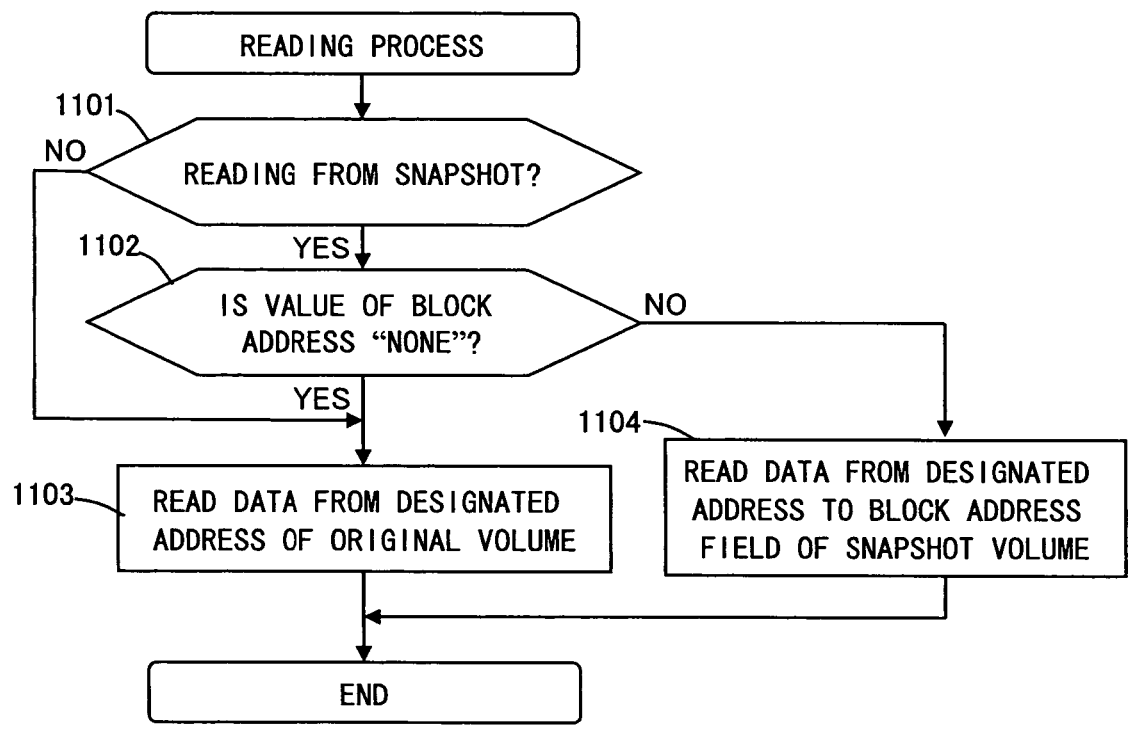
FIG. 4 is a flowchart of a reading process according to the first embodiment of this invention.

FIG. 4 is a flowchart showing a reading process executed by the snapshot management program 241.

The snapshot management program 241 first determines whether a reading target volume designated by the host 100 is the original volume 310 or a virtual volume of a snapshot.

Based on a result of the determination, determination is made as to whether reading is from a snapshot or not (1101).

If a result shows that a read request received from the host 100 corresponds to the original volume 310, the request is determined not to be reading from the snapshot, and data is read from a designated block address of the original volume 310 (1103).

On the other hand, if the read request received from the host 100 is from the virtual volume, the process proceeds to a step 1103 determining that the request is reading from the snapshot. Then, reference is made to the snapshot management table 2610 shown in FIG. 2A to obtain a value corresponding to a block address of the reading target virtual volume designated by the host 100, and determination is made as to whether the value is "NONE" or not (1102).

If a result of the determination shows that the value corresponding to the block address of the virtual volume is "NONE", data of the reading target block of the virtual volume corresponding to the reading target snapshot has not been stored in the snapshot volume 330. Thus, data is read from the designated block address of the original volume 310 (1103).

On the other hand, if the value of the block address referred to in the step 1102 is not "NONE" but a given number, the block address of the reading target virtual volume is correlated to the block address in the snapshot volume 330. In other words, data of the block address of the reading target virtual volume has been stored in the snapshot volume 330. Thus, the data is read from the block address of the snapshot volume 330 referred to in the step 1102 (1104).

Subsequently, the read block data is returned to the host 100 to complete the reading process.

Figure 5:
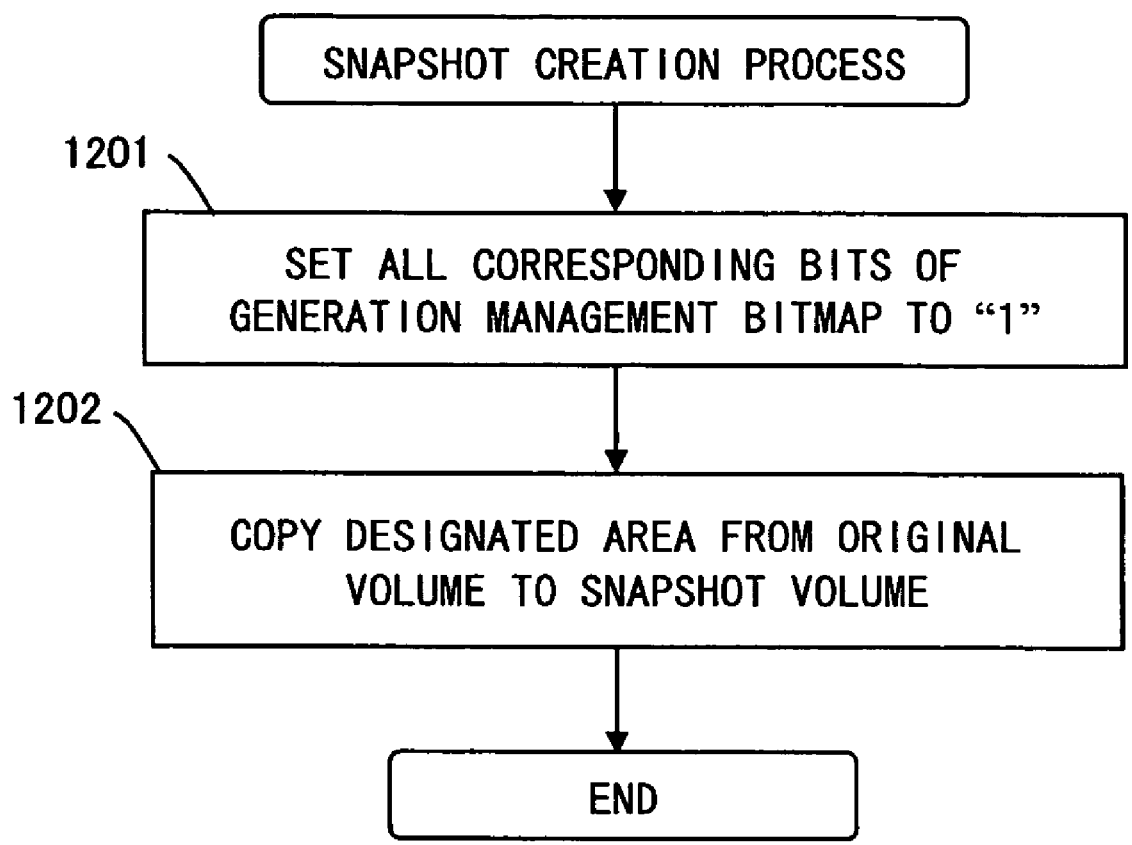
FIG. 5 is a flowchart of a snapshot creation process according to the first embodiment of this invention.

FIG. 5 is a flowchart showing a snapshot creation process of the snapshot management program 241.

Upon reception of a snapshot creation request from the host 100 or the CPU 220, the snapshot management program 241 registers virtual volumes of new generations in the snapshot management table 2610 shown in FIG. 2A. Then, in the generation management bitmap 2612 registered in the snapshot management table 2610, bits corresponding to the virtual volumes newly registered corresponding to snapshots to be newly created are all set to "1". Block addresses of the virtual volumes corresponding to the snapshots to be newly created are all set to "NONE" (1201).

Next, data read from an area of the original volume 310 designated as a target of snapshot creation is written in the snapshot volume 330. Then, the data stored in the designated area is copied from the original volume 310 to the snapshot volume 330 (1202).

Subsequently, the snapshot creation process comes to an end.

Incidentally, in the step 1201, in the generation management bitmap 2612 registered in the snapshot management table 2610, values of all the bits corresponding to the newly created virtual volumes are set to "1". However, when there is an unused block in the original volume 310, a block in the virtual volume corresponding to the unused block also becomes an unused block. At this time, a constitution may be employed in which in the unused block present in the newly created virtual volume, the bit corresponding to the newly created virtual volume is set to "1" in a block only other than the unused block of the generation management bitmap. The unused block is a block not allocated for data (file, directory, or the like) storage, but prepared to store data when a file or a directory is newly created or a size is increased thereafter.

Even when a write request in the unused block is issued, and data stored in the unused block is updated, no reference is made to the data of the unused block for the snapshot of the file system, and thus the data updating has no influence on the snapshot of the file system. Accordingly, when the unused portion is updated after snapshot creation, data before updating is not copied to the snapshot volume 330 if the generation management bitmap is "0" for the unused block during the snapshot creation, and the data updating in the unused block is reflected on the snapshot, consequently causing a change in the data of the snapshot creation time. However, in the file system that uses the snapshot, no influence is given on data of the file or the directory therein. Thus, by setting the generation management bitmap to "0" for the unused block when the snapshot is created, it is possible to reduce the amount of a generated difference.

Next, a creation process of the copy volume 320 will be described.

Figure 6:
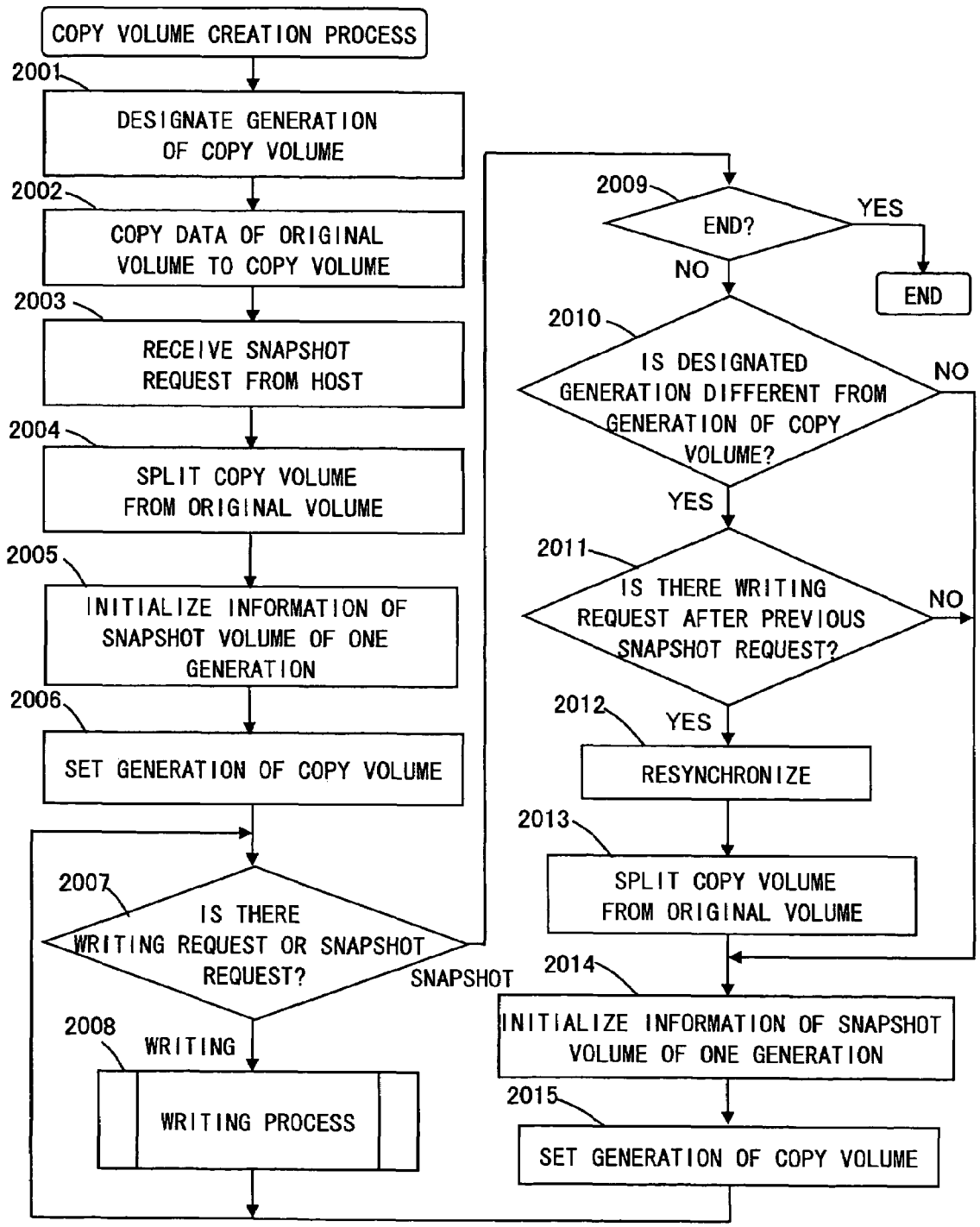
FIG. 6 is a flowchart of a copy volume creation process according to the first embodiment of this invention.

FIG. 6 is a flowchart showing a copy volume creation process of the snapshot management program 241.

According to this embodiment, a full copy of the original volume 310 of a given time is stored as a copy volume 320 in the storage.

First, the host 100 designates a generation to be set in the copy volume 320, and sends a request of copying the original volume (2001). For the generation designation, for example, an optional generation (1st generation, 2nd generation, or the like) or a generation just before a generation of a snapshot creation request can be designated.

Upon reception of the request, the snapshot management program 241 copies all data of the original volume 310 of a present time to the copy volume 320 (2002). Specifically, the original volume 310 and the copy volume 320 are first synchronized with each other. Then, the blocks of the original volume 310 are all copied to the copy volume 320. Accordingly, a replication of the original volume 310 is created.

After completion of copying the original volume 310 to the copy volume 320, the host 100 sends a snapshot creation request (2003). The snapshot management program 241 that has received the snapshot creation request first splits the original volume 310 from the copy volume 320 (2004). Thus, the original volume 310 and the copy volume 320 can both receive access. The host 100 may instruct separation of the original volume 310 from the copy volume 320.

Next, referring to the snapshot bitmap 261, information of a snapshot volume of one generation is initialized (2005). Then, information of a generation set in the copy volume 320 is set in the copy volume generation management information 262 (2006).

Next, determination is made as to whether a write request or a next snapshot creation request has been made from the host 100 or not (2007).

If there is a write request from the host, the process proceeds to a step 2008 to execute the writing process shown in FIG. 3. In other words, reference is made to the generation management bitmap 2612 of the snapshot bitmap 261, and the data of the block has been updated if all the bits are "0". Then, data is written in the designated block of the original volume 310.

On the other hand, if at least one bit is "1", data of the block before writing is copied to the snapshot volume, and written in a designated block of the original volume 310.

In the step 2007, when a next snapshot creation request, i.e., a snapshot creation request designating a generation different from that of the snapshot creation request made in the step 2003, comes from the host 100, the process proceeds to a step 2009. When there are no such requests, the process stands by.

In the step 2009, determination is made as to whether a process end has been instructed or not. If the process end has not been instructed, the process proceeds to a step 2010, and determines whether the generation designated by the snapshot creation request of the host 100 is different or not from a generation set in the copy volume 320.

If the present generation of the copy volume 320 is similar to the designated generation, the process proceeds to a step 2014.

On the other hand, if the present generation of the copy volume 320 is different from the designated generation, the process proceeds to a step 2011, and determines whether any write requests have been made or not after the previous snapshot creation request.

If no write request has been made, the process proceeds to the step 2014. If a write request has been made, the process proceeds to a step 2012, resynchronizes the original volume 310 with the copy volume 320, and copies all the data of the original volume 310 to the copy volume 320. Upon completion of the copying, the original volume 310 is split from the copy volume 320 (2013).

In the process from the step 2010 to the step 2013, for example, in the step 2001, when a generation of the copy volume 320 is designated to be one generation before that of the snapshot creation request, a new write request made after the snapshot creation request causes the generation of the copy volume 320 to be two generations before. Thus, resynchronization is executed with the copy volume 320 to obtain a copy of the designated generation one before.

In the step 2014, information of a snapshot volume of one generation is initialized from the snapshot bitmap 261. Then, information of the copy volume 320 is registered in the copy volume generation management information 262.

Through the process, the copy volume 320 of the designated generation is created.

Figure 7:
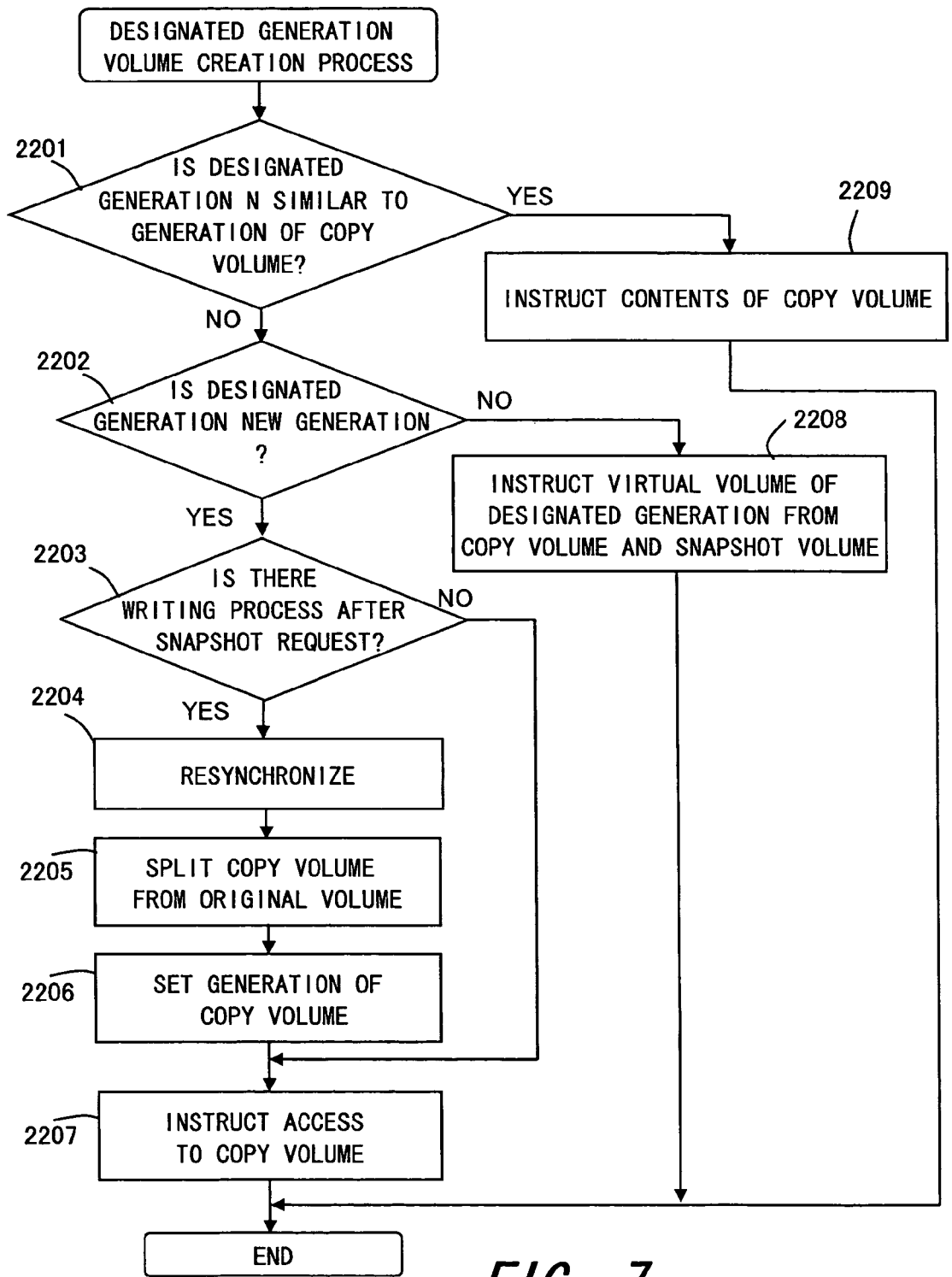
FIG. 7 is a flowchart of a designated generation volume creation process according to the first embodiment of this invention.

FIG. 7 is a flowchart of a process of creating a designated generation volume (virtual volume) by the generation volume create program 242.

The host 100 sends an access request a virtual volume of a designated generation N. The generation volume create program 242 that has received the access request determines whether the designated generation N is similar to the current generation of the copy volume 320 or not (2201). As the information of the generation of the copy volume 320 has been stored in the copy volume generation management information 262, the present copy volume generation can be obtained by referring to the information.

If the designated generation N is determined to be similar to that of the copy volume 320, data to which access has been requested are similar to those of the copy volume 320. Accordingly, the host 100 is instructed to access the copy volume 320 (2209), and the process is completed. By the process, the host 100 can access the virtual volume of the designated generation N.

If the designated generation N is determined to be different from that of the copy volume 320, determination is first made as to whether the designated generation N is latest or not (2202). For the generation information of the copy volume 320, reference is made to the copy volume generation management information 262.

If the designated generation N is determined not to be latest, the process proceeds to a step 2208, a virtual volume of a designated generation is designated from the copy volume 320 and the snapshot volume 330, and the process is finished. Specifically, reference is made to the snapshot bitmap 261 to obtain the virtual volume of the designated generation. In this case, block addresses of the original volume 310 and the copy volume 320 are similar to each other. Accordingly, for one of the blocks of the designated generation which refers to the original volume 310, reference to the block of the copy volume 320 is instructed by using a block address of the block indicated by the original volume block address 2611. Through the process, the host 100 can access the virtual volume of the designated generation N.

In the step 2202, if the designated generation N is determined to be latest, after a request of a latest-generation snapshot is made, determination is made as to whether writing has been executed or not in the original volume 310 (2203).

If the writing in the original volume 310 is determined to have been executed, the original volume 310 is resynchronized with the copy volume 320 to create data of the latter similar to those of the former (2204). Then, the original volume 310 is split from the copy volume 320 (2205). At a point of this time, the data of the copy volume 320 is similar to those of the original volume 310, i.e., in a latest state. Next, information of the copy volume 320 is registered in the copy volume generation management information 262 (2206). Then, access to the copy volume 320 is instructed (2207) to finish the process. Through the process, the host 100 can access the virtual volume of the designated generation N.

If no writing is determined in the step 2203, data to which access has been requested is similar to those of the copy volume 320. Thus, the host 100 is instructed to access the copy volume 320 (2207) to finish the process. Through the process, the host 100 can access the virtual volume of the designated generation N.

Figure 8:
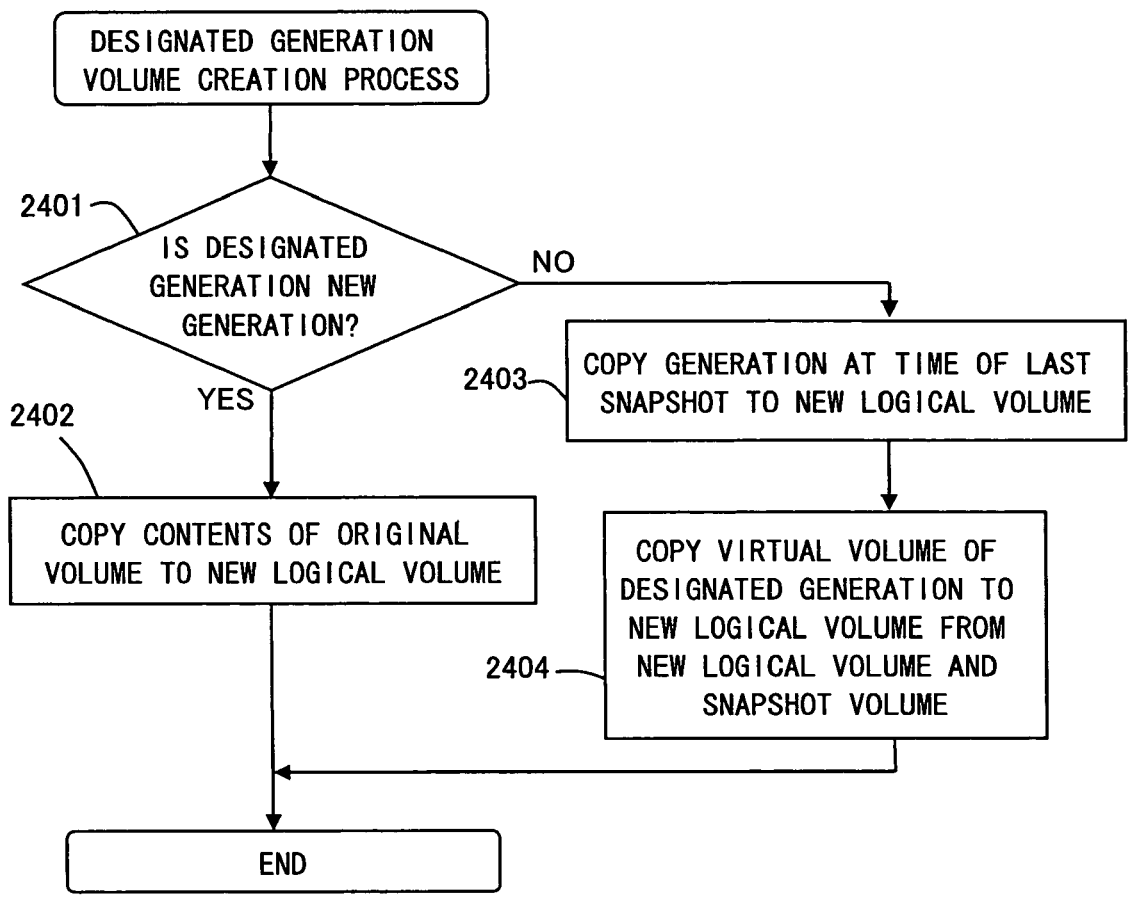
FIG. 8 is a flowchart of a process of accessing a designated generation virtual volume according to the first embodiment of this invention.

FIG. 8 is a flowchart showing a process of creating a designated generation volume (virtual volume) by the generation volume create program 242. According to the process, when interference occurs in the copy volume 320 or the like, data of the copy volume 320 is created in a new drive (logical volume) to restore the copy volume 320.

The host 100 detects the occurrence of interference or the like in the copy volume 320, and sends a request of creating a generation N of the copy volume 320 as a new volume. The generation volume create program 242 that has received the request first determines whether the designated generation N is a latest generation or not (2401). If the designated generation N is determined to be latest, since data of the original volume 310 is similar to those of the copy volume 320, the data of the original volume 310 is copied to the restoration target logical volume. At this time, using information of the logical volume as information of the copy volume 320, mapping information of the snapshot bitmap 261, the copy volume generation management information 262 or the like is changed to finish the process (2402).

On the other hand, if the designated generation N is determined not to be latest, a volume of a generation before a time of a last snapshot creation request is created in a new logical volume from the original volume 310 and the snapshot volume 330 (2403). Specifically, a virtual volume of a generation of the time of the last snapshot creation request is copied to a new logical volume from the present original and snapshot volumes 310 and 330.

Next, a virtual volume of a designated generation is created based on data of the logical volumes, i.e., data of the original and snapshot volumes 310 and 330 of the generation of the time of the last snapshot, and copied to the restoration target logical volume of the copy volume 320 (2404).

Specifically, the virtual volume of the designated generation is obtained by referring to the snapshot bitmap 261. In this case, block addresses of the data of the logical volume of the generation of the time of the last snapshot and the original volume 310 are similar to each other. Thus, for one of the designated generation blocks which refers to the original volume 310, reference is made to a block of the logical volume by using a block address of the block indicated by an original volume block address 2611.

Through the process, since the virtual volume of the designated generation can be obtained, the virtual volume is copied to the restoration target logical volume of the copy volume 320.

By the virtual volume creation process, when interference occurs in the copy volume, it is possible to restore the copy volume to a new logical volume from the original volume 310 and the snapshot volume 330.

Figure 9:
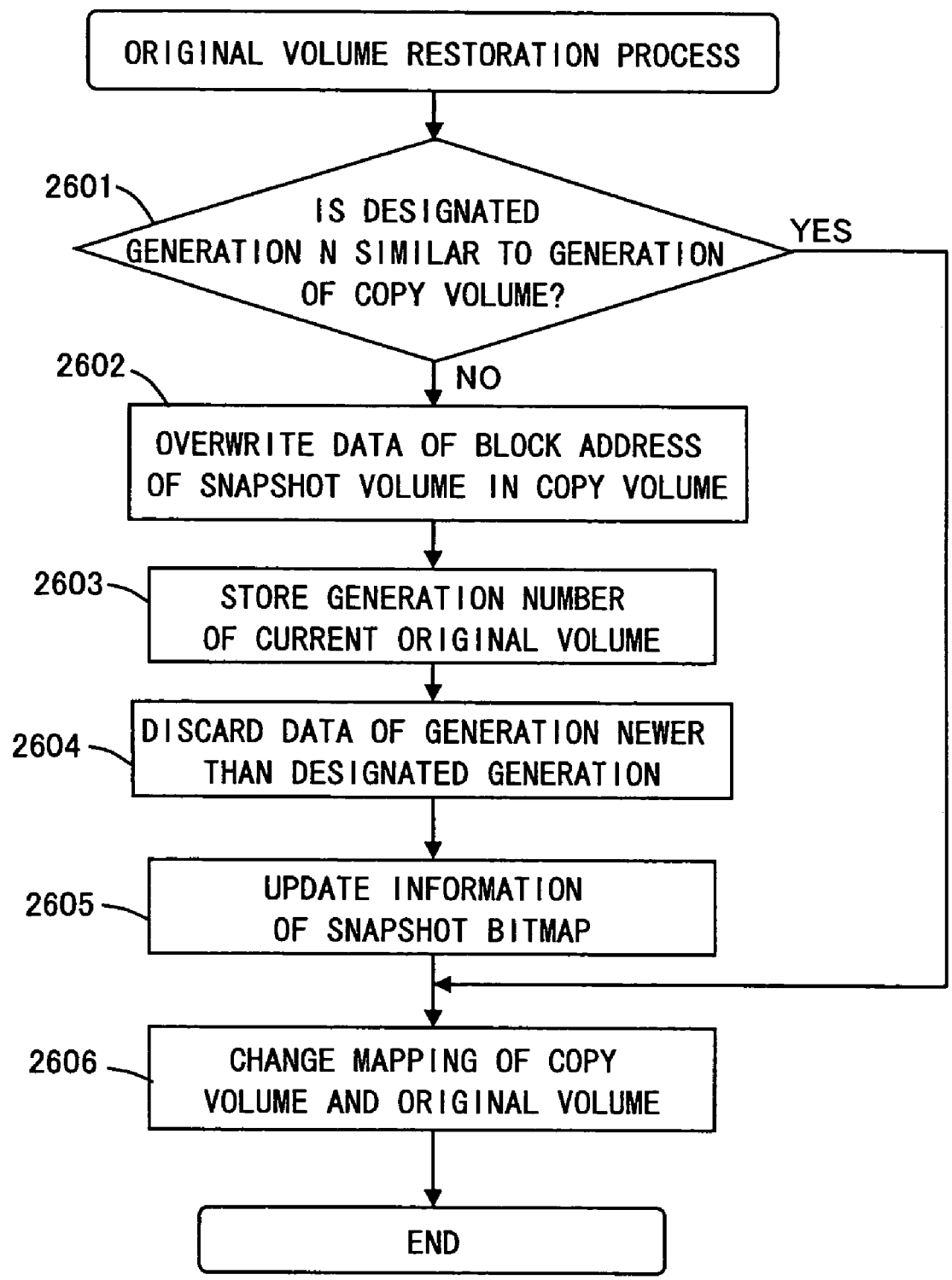
FIG. 9 is a flowchart of an original volume restoration process according to the first embodiment of this invention.

FIG. 9 is a flowchart showing a process of restoring the original volume 310 by the original volume restore program 243.

Due to interference or the like in the original volume 310, the host 100 sends a request of creating the original volume 310 as a new volume of a designated generation N. The original volume restore program 243 that has received the request first determines whether the designated generation N is a generation of the copy volume 320 or not (2601). If the designated generation N is similar to that of the copy volume 320, data of the copy volume 320 can be directly used as those of the original volume 310. Accordingly, the copy volume 320 is changed to information of the original volume 310, and mapping information of the snapshot bitmap 261, the copy volume generation management information 262 or the like is changed to finish the process (2606).

On the other hand, if the generation of the copy volume 320 is different from the designated generation N, first, referring to the snapshot bitmap 261, for a block address of the designated generation indicating the snapshot volume 330, data of the block address is overwritten in the copy volume 320 (2602).

Next, a generation number of the present original volume 310 is stored (2603).

Next, data of generations (N+1 generation and afterward) newer than the designated generation N of the copy volume 320 and the snapshot volume 330 are discarded. Further, data of the snapshot bitmap 261 is discarded (2604).

Next, the information of the snapshot bitmap 261 is updated to a block address of the present copy volume 320. The block addresses of the original volume 310 and the copy volume 320 are similar, with the result that the address becomes a block address of a new restored original volume (2605).

Then, mapping information of the copy volume 320 is changed to information of the original volume 310. Specifically, the copy volume 320 is changed to the original volume 310 by changing the mapping information of the snapshot bitmap 261, the copy volume generation management information 262 or the like. Then, the process is finished (2606).

By the above process, when interference occurs in the original volume 310, it is possible to restore the original volume 310 to a new logical volume from the copy volume 330 and the snapshot volume 330.

Figure 10:
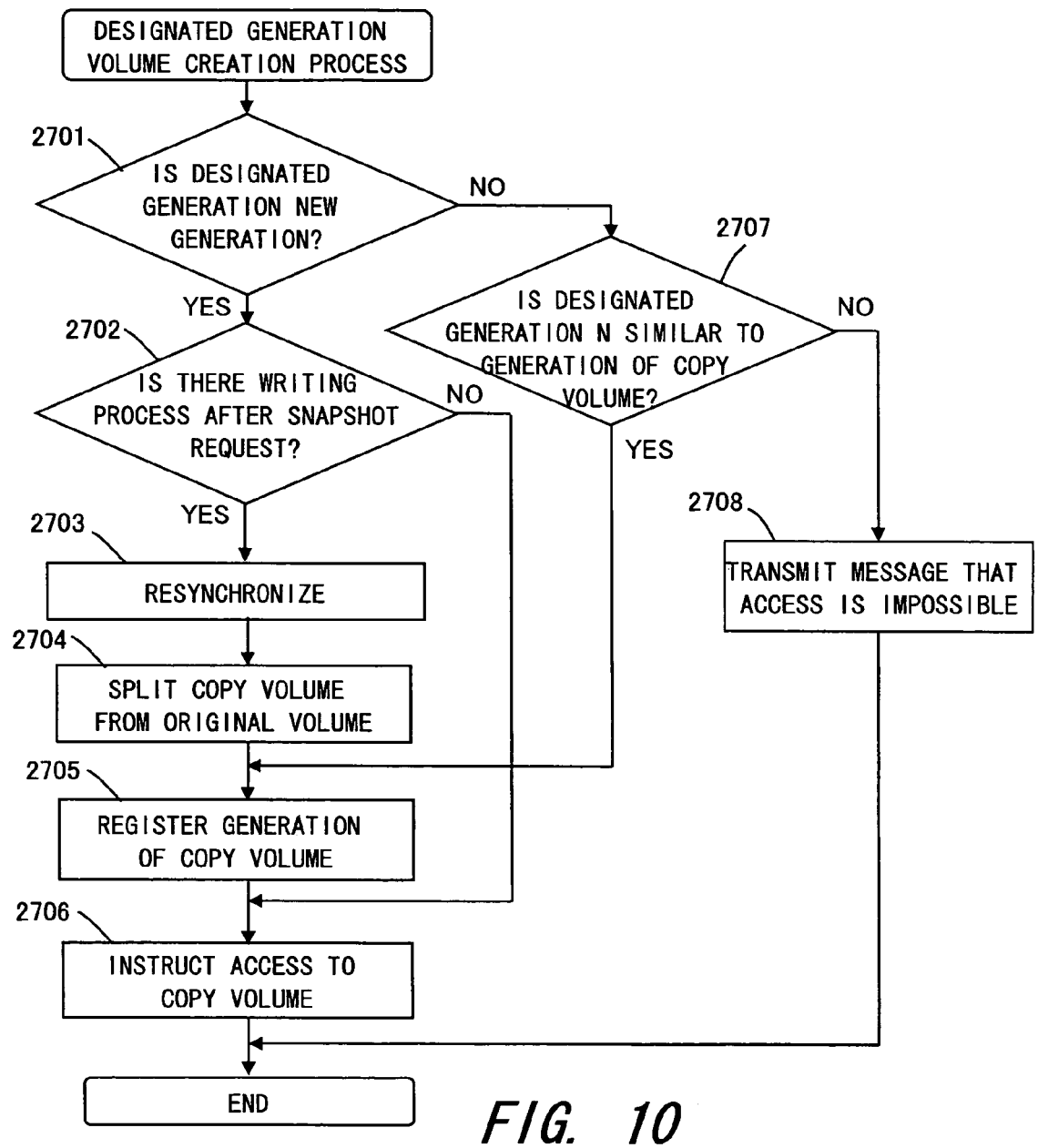
FIG. 10 is a flowchart of a designated generation volume creation process according to the first embodiment of this invention.

FIG. 10 is a flowchart showing a process of creating a designated generation volume (virtual volume) by the generation volume create program 242. According to the process, when interference occurs in the snapshot volume 330 or the like, access is made to the virtual volume of the designated generation without using any snapshot volumes.

The host 100 sends an access request a virtual volume of a designated generation N. The generation volume create program 242 that has received the request determines whether the designated generation N is a latest generation or not (2701). It should be noted that generation information of the copy volume 320 is obtained by referring to the copy volume generation management information 262.

In the step 2701, if the designated generation N is determined to be latest, after a request of a latest-generation snapshot is made, determination is made as to whether writing has been executed or not in the original volume 310 (2702).

If the writing in the original volume 310 is determined to have been executed, the original volume 310 is resynchronized with the copy volume 320 to create data of the latter similar to those of the former (2703). Then, the original volume 310 is split from the copy volume 320 (2704). At a point of this time, the data of the copy volume 320 are similar to those of the original volume 310, i.e., in a latest state.

Next, information of the copy volume 320 is registered in the copy volume generation management information 262 (2705). Then, access to the copy volume 320 is instructed (2706) to finish the process. Through the process, the host 100 can access the virtual volume of the designated generation N.

If no writing is determined in the step 2702, data to which access has been requested is similar to those of the copy volume 320. Thus, the host 100 is instructed to access the copy volume 320 (2703) to finish the process. Through the process, the host 100 can access the virtual volume of the designated generation N.

If the designated generation N is determined not to be latest in the step 2701, the process proceeds to a step 2707, and determines whether the designated generation N is similar to that of the present copy volume 320 or not.

If the designated generation N is similar to that of the present copy volume 320, information of the copy volume 320 is registered in the copy volume generation management information 262 (2705).

Next, access to the copy volume 320 is instructed (2706) to finish the process. Through the process, the host 100 can access the virtual volume of the designated generation N.

On the other hand, if the designated generation N is determined not to be similar to that of the present copy volume 320 in the step 2707, the generation N is present in a block address stored in the snapshot volume 330. However, writing in the snapshot volume 330 is impossible due to interference. Thus, the generation volume create program 242 transmits a message that a virtual volume of the generation N cannot be created to the host 100 which makes access (2708), and finishes the process.

Figure 11:
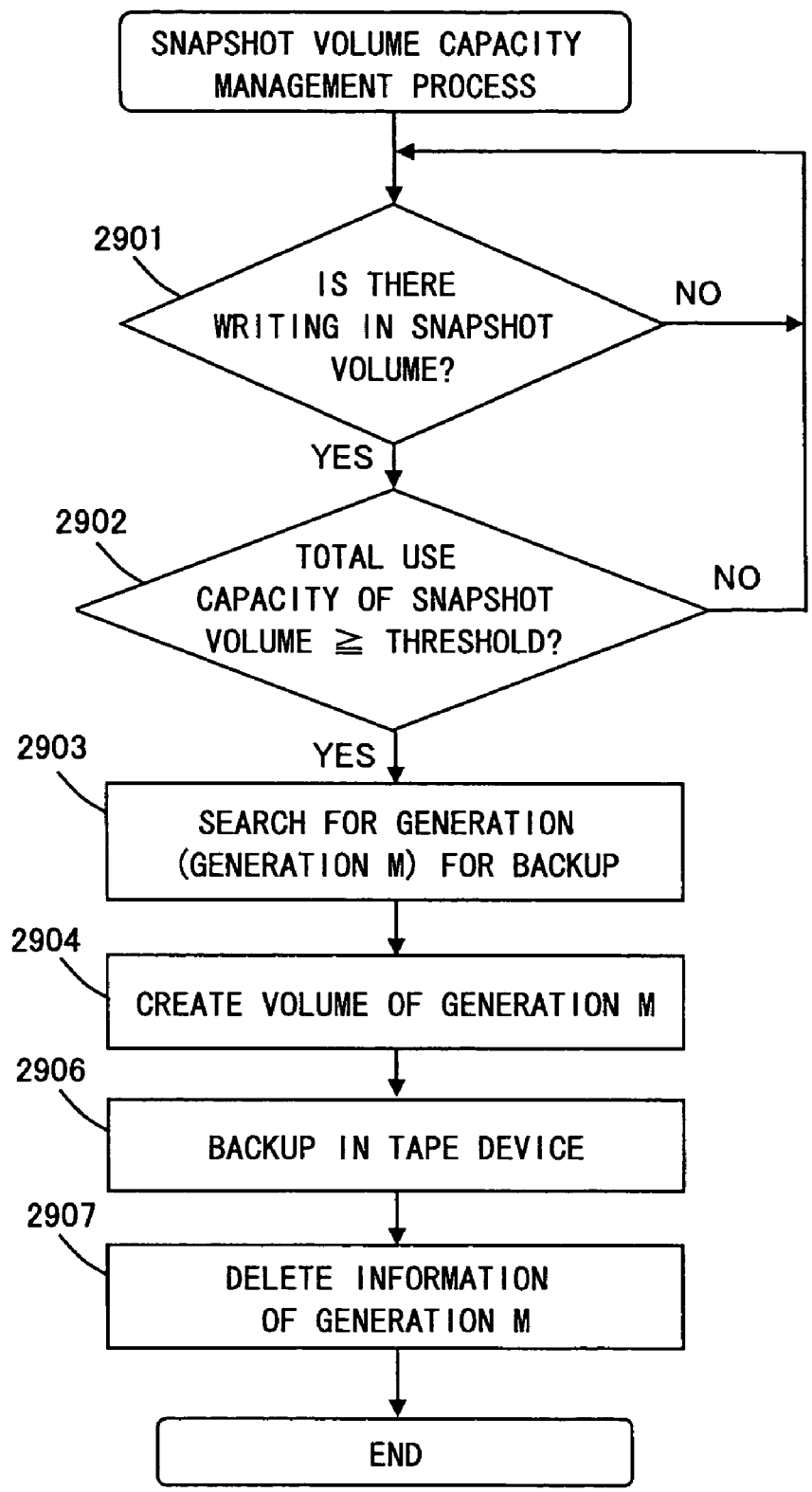
FIG. 11 is a flowchart of a snapshot volume capacity management process according to the first embodiment of this invention.

FIG. 11 is a flowchart showing a capacity management process of the snapshot volume 330 by the snapshot volume capacity management program 244.

The snapshot volume capacity management program 244 is started when a write request (updating) in the snapshot volume 330 is received. The program 244 monitors a total use amount of the snapshot volume 330 so as not to exceed a predetermined threshold. If exceeded, a process such as backup in the tape library 400 is carried out.

The snapshot volume capacity management program 244 first determines whether writing has been executed or not in the snapshot volume 330 (2901). If no writing has been executed, the process stands by until writing is executed.

If writing is determined to have been executed, determination is made as to whether a total use amount of the snapshot volume 330 becomes equal to or higher than the predetermined threshold or not (2902). The use amount of the snapshot volume 330 has been stored in the capacity management information 264 registered at a time of accessing the snapshot volume 330. If the total use amount of the snapshot volume is less than the predetermined threshold, the process returns to the step 2901. If the total use amount of the snapshot volume is equal to or higher than the predetermined threshold, a generation of low priority (generation M) is searched for in the data of the snapshot volume 330.

For priority determination, a generation that includes data that has not been accessed for a predetermined time from last access, a generation that includes data of low access frequency, and a generation of a large volume of the data are judged to be low in priority.

Next, a volume of the searched generation M of low priority is created (2904). In this case, access may be accepted as a virtual volume, or the volume may be copied to a new logical volume. Then, the volume of the generation M is backed up in the tape library 400 (2905).

Next, information of the generation M is deleted (2906). Specifically, data which the generation M only refers to is specified by referring to the snapshot block management table 2620. Then, the specified data which the generation M only refers to is deleted from the snapshot volume 330. Subsequently, the information of the generation M is deleted from the snapshot bitmap 261.

Through the process, the use amount of the snapshot volume 330 can be set to a volume which does not exceed the predetermined threshold.

A capacity of the snapshot volume 330 can be dynamically managed by user's designation. For example, when the user designates the number of generations, if the capacity of the snapshot volume 330 reaches an upper limit at the number of generations smaller than the designated number of generations, data of the old generations are backed up in the tape library 400. When the user designates a capacity of the snapshot volume 330, the data of the old generations are backed up in the tape library 400 until the designated capacity can be secured. In place of the backup in the tape library 400, the data of the generations may be deleted. The user may instruct backup in the tape library 400. The user may instruct deletion of the data of the generations.

Next, an operation example to which the storage system is applied will be described.

Figure 12:
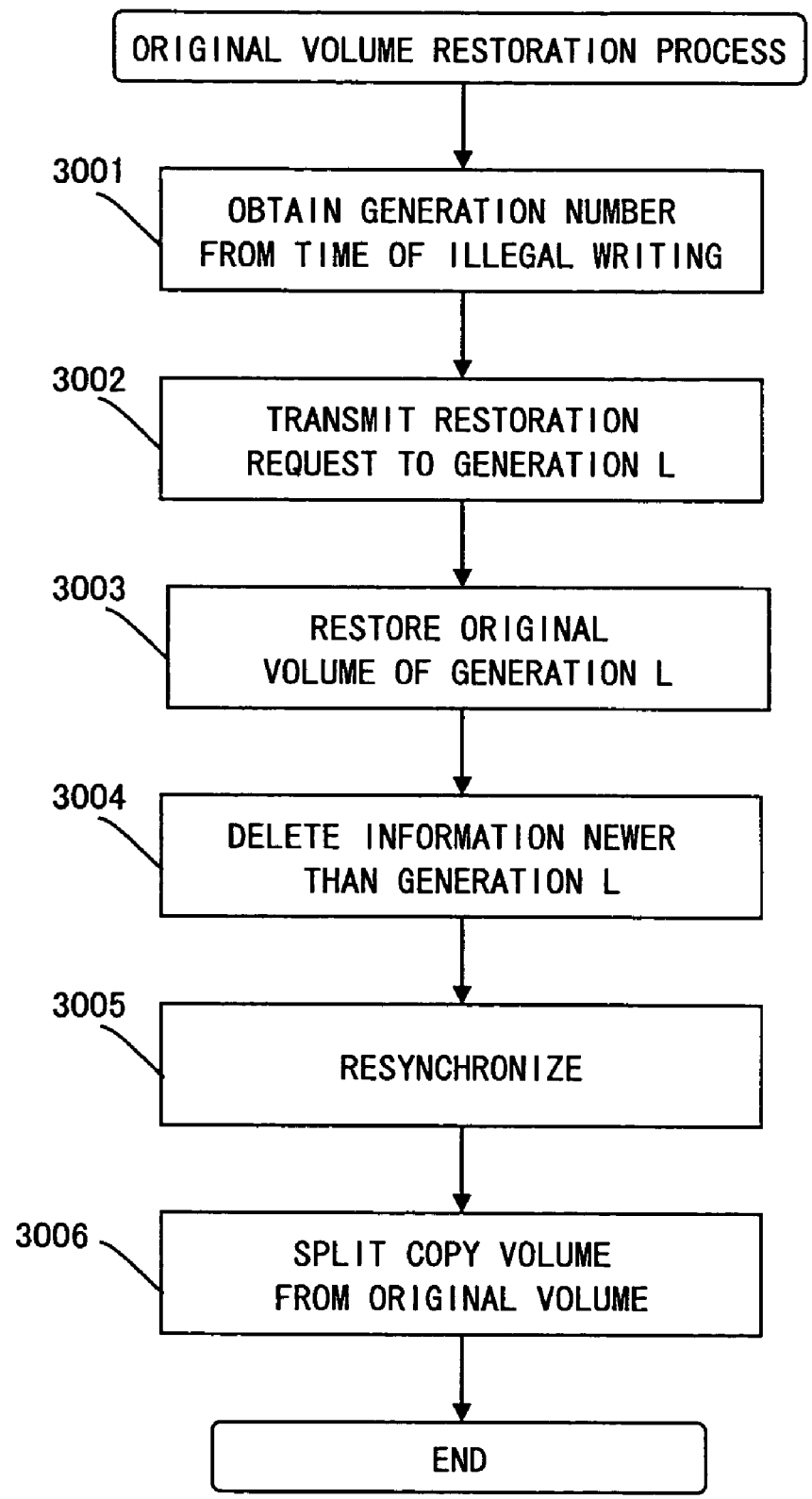
FIG. 12 is a flowchart of a process of restoring data of an original volume according to the first embodiment of this invention.

FIG. 12 shows an example of restoring data of the original volume 310 to those before a time of illegal writing when the past illegal writing is detected in the storage control unit 200.

When the user discovers illegal writing, the following process is carried out.

First, the user refers to the snapshot information 263 in the common memory of the storage control unit 200 from the host 100. In the snapshot information 263, a time and a generation number of a snapshot are stored. Thus, the user obtains a generation number (generation L) registered at a time before the time of illegal writing (3001).

Next, the user sends a request of returning the original volume 310 to the generation L to the storage control unit 200 (3002).

In the storage control unit 200 that has received the request, the original volume restore program 243 restores the original volume of the designated generation L. Specifically, first, virtual volumes of the generation L are obtained by referring to the snapshot bitmap 261. For a virtual volume among those of the generation L which indicates a block address of the snapshot volume 330, a block address thereof is copied to the original volume 310. Accordingly, the original volume 310 of the designated generation L is created (3003).

After the original volume 310 has become the generation L, information of generations newer than the generation L is deleted (3004).

Then, the original volume 10 is resynchronized with the copy volume 320 to create data of the latter similar to those of the former (3005). Subsequently, the original volume 310 is split from the copy volume 320 (3006). Thus, the data of the copy volume 320 become similar to those of the original volume 310.

Through the process, the original volume 310 can be restored to a past optional generation by user's designation. It should be noted that, in place of restoring the original volume 310 to the designated generation, the copy volume 320 may be set to the designated generation L, and then mapping information may be changed to change the copy volume of the generation L to the original volume 310.

Figure 13:
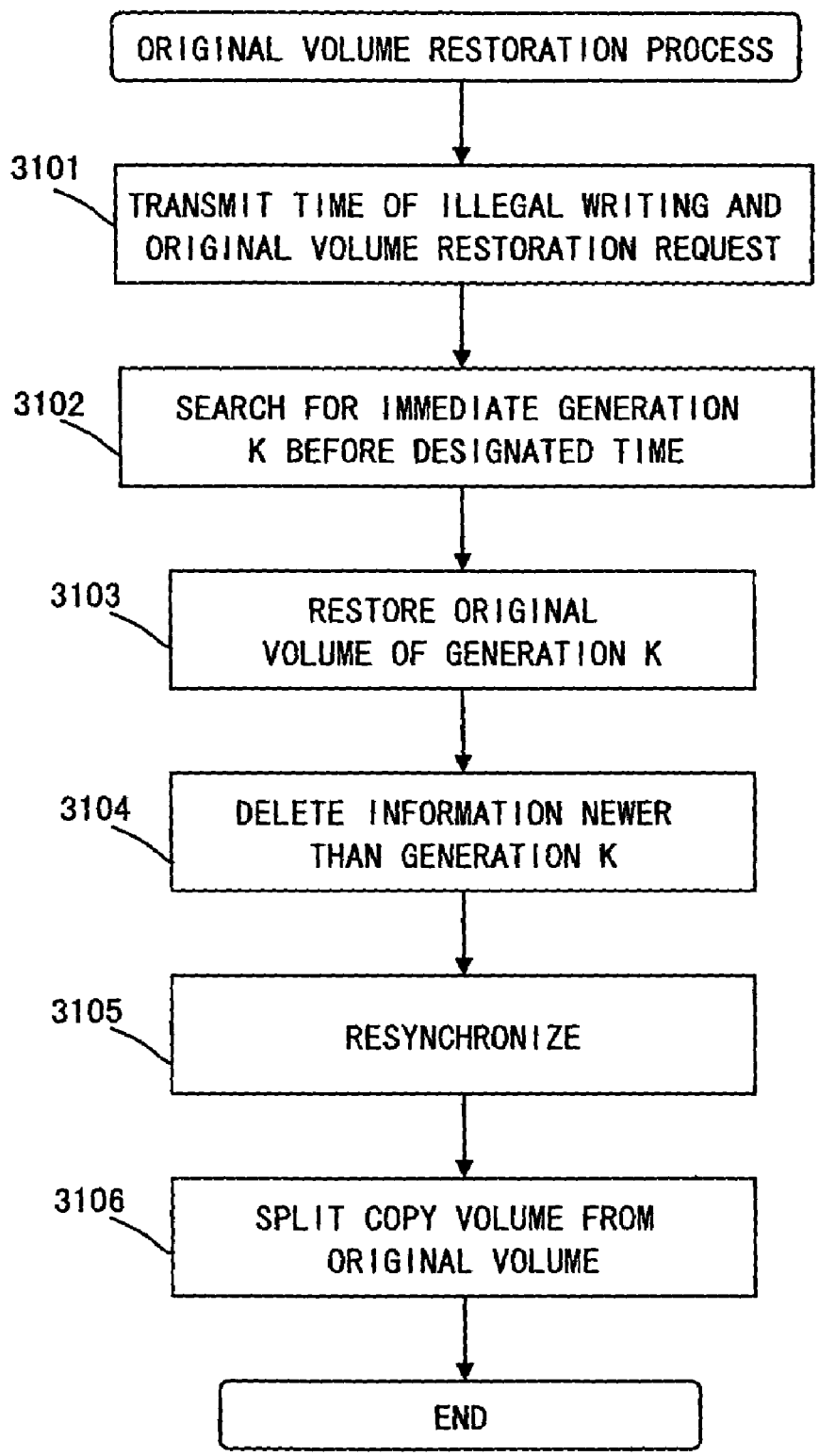
FIG. 13 is a flowchart of a process of restoring data of an original volume according to the first embodiment of this invention.

FIG. 13 shows another operation example to which the storage system is applied.

The user sends a time of illegal writing and a restore request of the original volume to the storage control unit 200 from the host 100. Upon reception of the request, the storage control unit 200 automatically restores data of the original volume 310 to those before the time of the illegal writing.

When the user discovers illegal writing, the following process is carried out.

First, the user sends a time of illegal writing and a restore request of the original volume to that of a generation immediately before the time (3101).

In the storage control unit 200 that has received the request, the original volume restore program 243 obtains the designated time, and searches for a generation immediately before the time (3102). Specifically, a generation K is searched, which satisfies the following formula in which "T3" is a designated time and TK is a time of snapshooting the generation K:

$$TK < T3 < TK+1$$

By the formula, the generation K is obtained in which the time of snapshooting the generation K is before the designated time T3, and a time of snapshooting a generation K+1 as a generation subsequent to the generation K is after the designated time T3. Alternatively, a generation K that satisfies the following formula is searched for:

$$TK = T3$$

By the formula, the generation K is obtained in which the time of snapshooting the generation K is similar to the designated time T3.

Thus, the generation K immediately before the designated time T3 is obtained.

Next, the original volume 310 is restored to the obtained generation K.

Specifically, virtual volumes of the generation K are obtained by referring to the snapshot bitmap 261. For one of the virtual volumes of the generation K which indicates a block address of the snapshot volume 330, the block address is copied to the copy volume 310. Accordingly, the original volume 310 of the designated generation K is created (3103).

After the original volume 310 becomes the generation K, information of generations newer than the generation K is deleted (3104).

Then, the original volume 310 is resynchronized with the copy volume 320 to create data of the latter similar to those of the former (3105). Subsequently, the original volume 310 is split from the copy volume 320 (3106). Accordingly, the data of the copy volume become similar to those of the original volume 310.

Through the process, by user's time designation, the original volume 310 can be restored to a past optional generation. It should be noted that, in place of restoring the original volume 310 to the designated generation, the copy volume 320 may be set to the designated generation K, and then mapping information may be changed to change the copy volume of the generation K to the original volume 310.

As described above, according to the storage system of the first embodiment of this invention, since the storage 300 includes the original volume 310, the copy volume 320 for storing the full copy of the original volume 310 at a given time, and the snapshot volume 330 for storing the snapshot of the data written in the original volume 310, the volume of the designated generation can be obtained. Thus, it is possible to store the backup of the designated generation in the storage system, and to access and back up the data of the designated generation without using a tape library or other such devices of a low communication speed while a storage capacity is kept low.

Next, a second embodiment of this invention will be described.

According to the second embodiment of this invention, a copy volume 320 backs up data in real time at a time of access to an original volume in place of obtaining a copy of data of a designated generation. Components similar to those of the first embodiment are denoted by similar reference numerals, and description thereof will be omitted.

Figure 14:
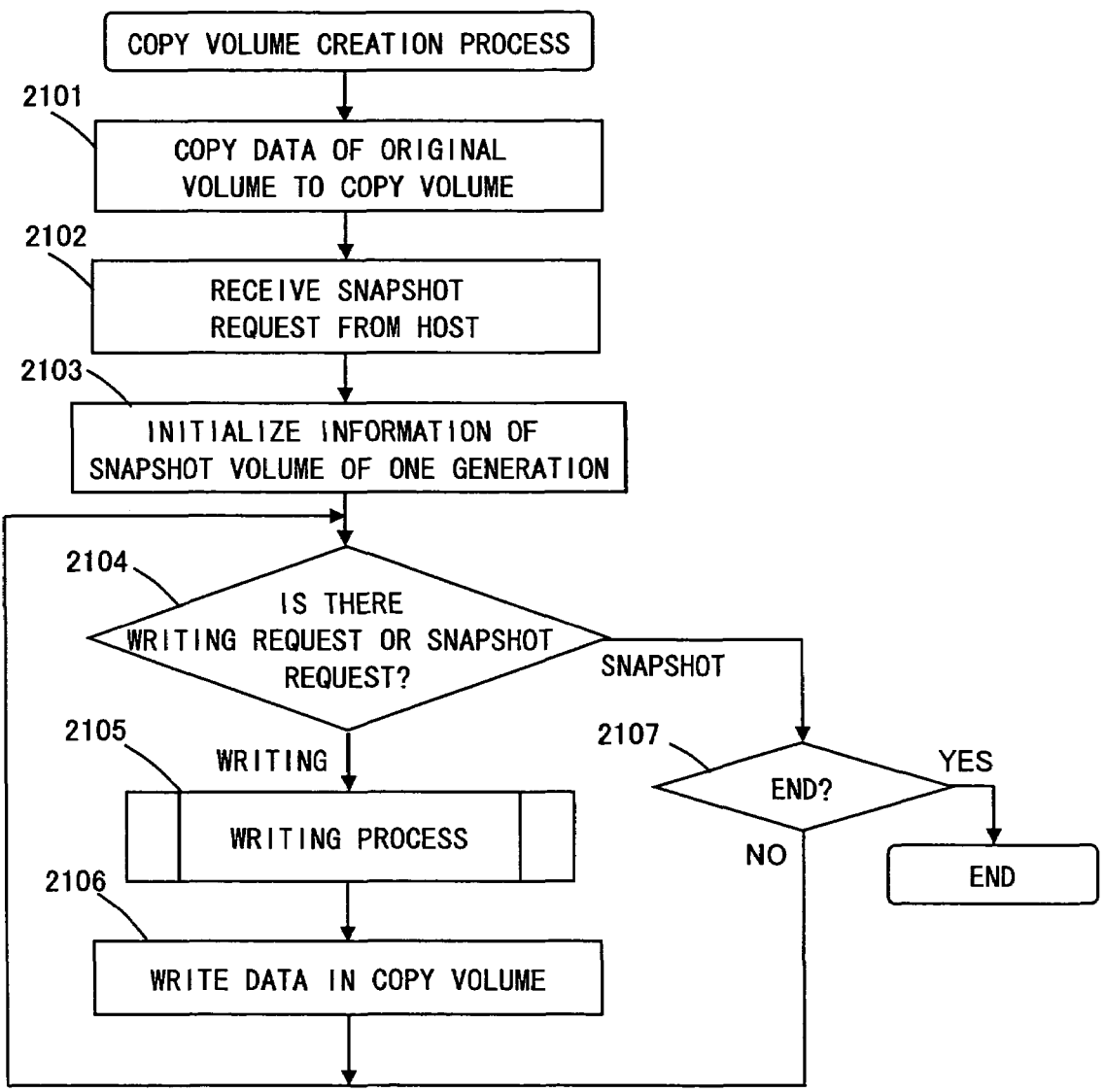
FIG. 14 is a flowchart of a copy volume creation process according to a second embodiment of this invention.

FIG. 14 is a flowchart showing a copy volume creation process of a snapshot management program 241 according to the second embodiment of this invention. FIG. 14 is similar to FIG. 6, but data of the copy volume 320 is always updated when a write request comes from a host 100.

Upon start of the process, the snapshot management program 241 copies all data of the original volume 310 of a present time to the copy volume 320 (2101). Specifically, the original volume 310 and the copy volume 320 are synchronized with each other. Then, blocks of the original volume 310 are all copied to the copy volume 320. Accordingly, a copy of the original volume 310 is created.

After completion of copying the original volume 310 to the copy volume 320, the host 100 sends a snapshot creation request (2102). The snapshot management program 241 that has received the snapshot creation request first splits the original volume from the copy volume. Then, referring to a snapshot bitmap 261, information of a snapshot volume of one generation is initialized (2103).

Next, determination is made as to whether a write request or a next snapshot creation request has been made from the host 100 or not (2104).

If there is a write request from the host, the process proceeds to a step 2105 to execute writing shown in FIG. 3. In other words, reference is made to a generation management bitmap 2612 of the snapshot bitmap 261, and the data of the block has been updated if all the bits are "0". Then, data is written in the designated block of the original volume 310.

On the other hand, if at least one bit is "1", data of the block before writing is copied to the snapshot volume, and written in a designated block of the original volume 310.

Upon completion of the writing process, data (updated block) written in the original volume 310 is also written in the copy volume 310 (2106).

In the step 2104, when a next snapshot creation request comes from the host 100, i.e., a snapshot creation request designating a generation different from that of the snapshot creation request made in the step 2102, the process proceeds to a step 2107. When there are no such requests, the process is repeated and waits for a request.

In the step 2107, whether or not to finish the process is determined. If the process is not finished, the process returns to the step 2104, and prepares for a write request from the host 100.

Through the process, when the write request in the block of the original volume 310 comes from the host 100, writing is executed in a similar block of the copy volume 320, and a copy similar to the state of the original volume 310 is always stored.

Figure 15:
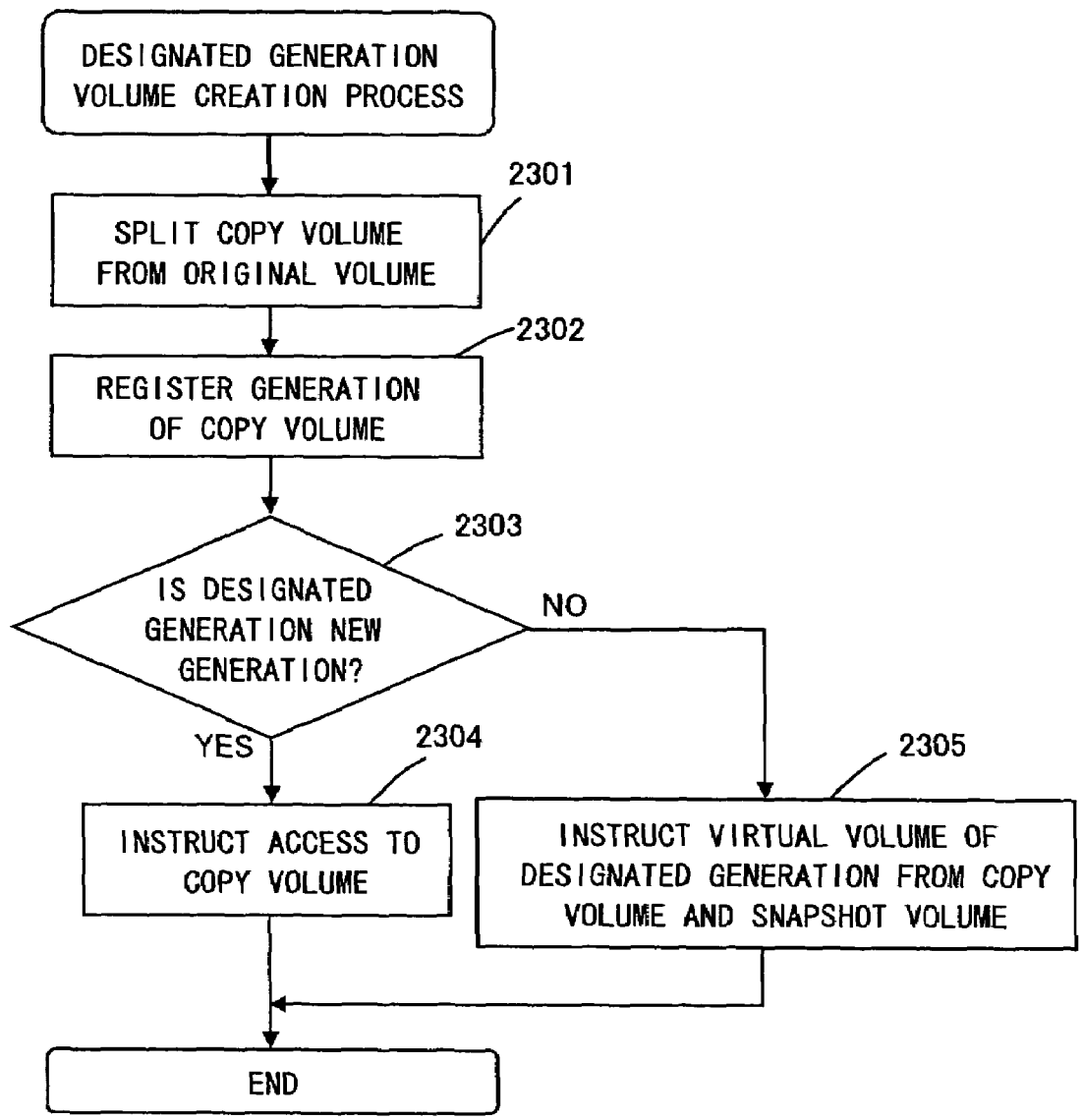
FIG. 15 is a flowchart of a designated generation volume creation process according to the second embodiment of this invention.

FIG. 15 is a flowchart showing a process of creating a designated generation volume (virtual volume) by a generation volume create program 242 according to the second embodiment of this invention. FIG. 15 is similar to FIG. 7, but the copy volume 320 always holds a copy of data of the original volume 310.

The host 100 sends an access request a virtual volume of a designated generation N. The generation volume create program 242 that has received the request splits the original volume 310 from the copy volume 320 (2301).

Next, generation information of the present copy volume 320 is registered in a copy volume generation management information 262 (2302). Then, data of the snapshot bitmap 261 is updated.

Next, determination is made as to whether the generation N designated from the host 100 is latest or not (2302). If the designated generation N is determined to be latest, data to which access has been requested is similar to those of the copy volume 320. Accordingly, the host 100 is instructed to access the copy volume 320 (2304) to finish the process. Through the process, the host 100 can access a virtual volume of the designated generation N.

On the other hand, if the designated generation N is determined not to be latest, the process proceeds to a step 2208, a virtual volume of a designated generation is designated from the copy volume 320 and the snapshot volume 330, and the process is finished (2305). Specifically, reference is made to the snapshot bitmap 261 to obtain the virtual volume of the designated generation. In this case, block addresses of the original volume 310 and the copy volume 320 are similar to each other. Accordingly, for one of the blocks of the designated generation which refers to the original volume 310, reference is made to the block of the copy volume 320 by using a block address of the block indicated by an original volume block address 2611. Through the process, the host 100 can access the virtual volume of the designated generation N.

By the process, even in a constitution in which the data of the original volume 310 and the copy volume 320 are always synchronized with each other, access can be made from the host to the designated generation volume.

Figure 16:
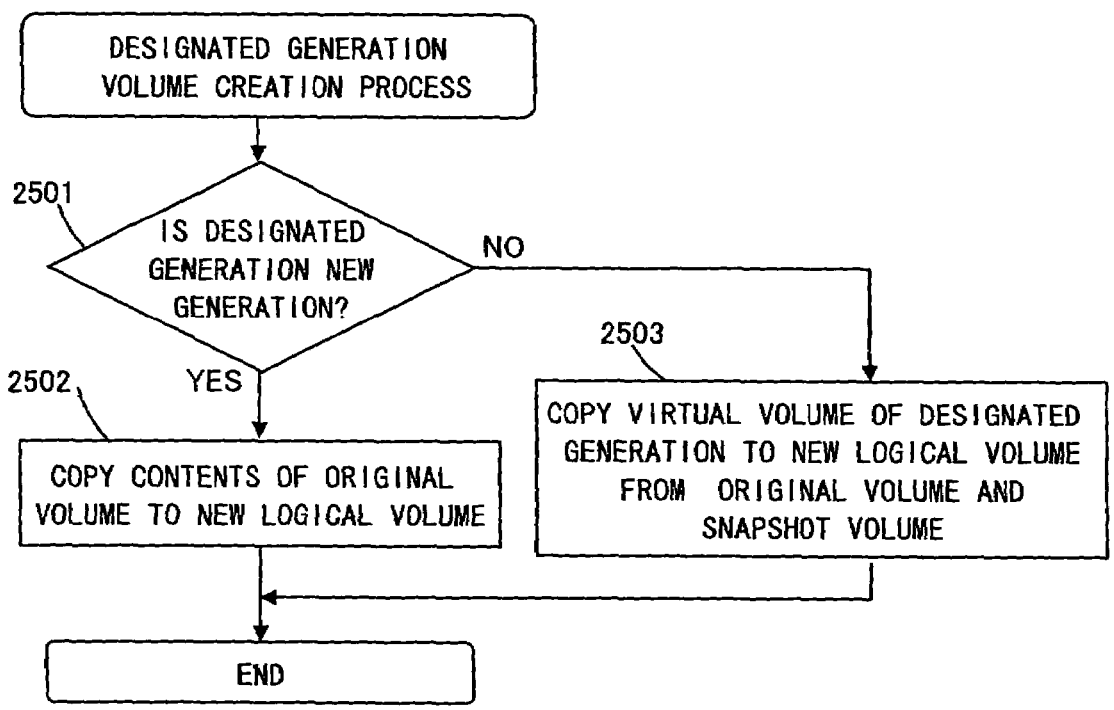
FIG. 16 is a flowchart of a designated generation volume creation process according to the second embodiment of this invention.

FIG. 16 is a flowchart showing a process of creating a designated generation volume (virtual volume) by a generation volume create program 242 according to the second embodiment of this invention. According to the process, when interference occurs in the copy volume 320 or the like, data of the copy volume 320 is created in a new drive (logical volume) to restore the copy volume 320. FIG. 16 is similar to FIG. 8, but the copy volume 320 always holds a copy of data of the original volume 310.

The host 100 detects the occurrence of interference or the like in the copy volume 320, and sends a request of creating a generation N of the copy volume 320 as a new volume. The generation volume create program 242 that has received the request first determines whether the designated generation N is a latest generation or not (2501). If the designated generation N is determined to be latest, since data of the original volume 310 is similar to those of the copy volume 320, the data of the original volume 310 is copied to the restoration target logical volume.

At this time, using information of the logical volume as information of the copy volume 320, mapping information of the snapshot bitmap 261, the copy volume generation management information 262 or the like is changed to finish the process (2502).

On the other hand, if the designated generation N is determined not to be latest, a volume of the designated generation N is created in a new logical volume from the original volume 310 and the snapshot volume 330 (2503).

In other words, a virtual volume of the designated generation is created from data of the original volume 310 and data of the snapshot volume 330, and copied to a restoration target logical volume of the copy volume 320. Specifically, the virtual volume of the designated generation is obtained by referring to the snapshot bitmap 261.

Through the process, since the virtual volume of the designated generation can be obtained, the virtual volume is copied to the restoration target logical volume of the copy volume 320.

By the volume creation process, when interference occurs in the copy volume, it is possible to restore the copy volume to a new logical volume from the original volume 310 and the snapshot volume 330.

Figure 17:
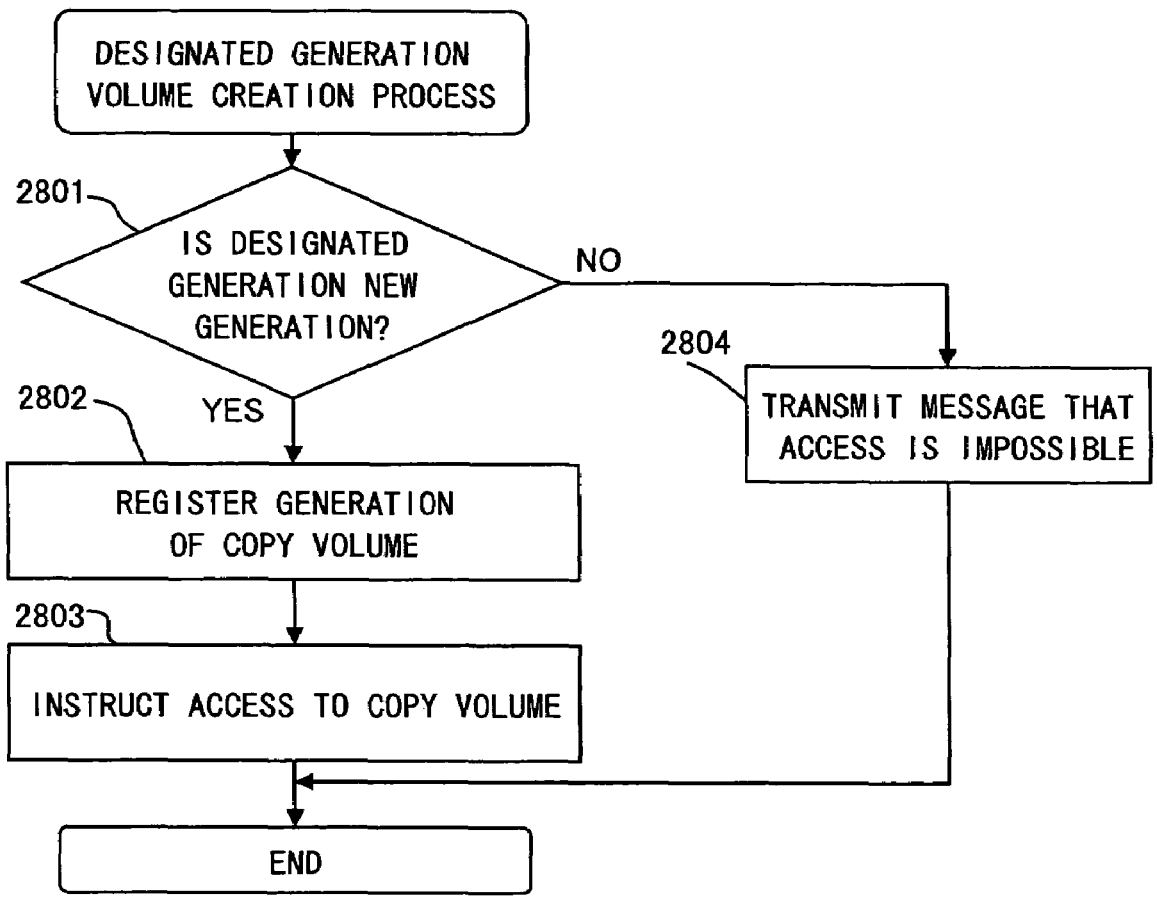
FIG. 17 is a flowchart of a designated generation volume creation process according to the second embodiment of this invention.

FIG. 17 is a flowchart showing a process of creating a designated generation volume (virtual volume) by the generation volume create program 242 according to the second embodiment of this invention. According to the process, when interference occurs in the snapshot volume 330 or the like, access is made to the virtual volume of the designated generation without using any snapshot volumes. FIG. 17 is similar to FIG. 10, but the copy volume 320 always holds a copy of data of the original volume 310.

The host 100 sends an access request a virtual volume of a designated generation N. The generation volume create program 242 that has received the request determines whether the designated generation N is a latest generation or not (2801). It should be noted that generation information of the copy volume 320 is obtained by referring to the copy volume generation management information 262.

In the step 2801, if the designated generation N is determined to be latest, information of the copy volume 320 is registered in the copy volume generation management information 262 (2802). Next, access to the copy volume is instructed (2803) to finish the process. Through the process, the host 100 can access the virtual volume of the designated generation N.

In the step 2801, if the designated generation N is determined not to be latest, the generation N is present in a block address stored in the snapshot volume 330. However, reading in the snapshot volume 330 is impossible due to interference. Thus, the generation volume create program 242 sends a message that the generation N cannot be accessed to the host 100 which makes access (2804) to finish the process.

As described above, according to the storage system of the second embodiment of this invention, since the storage 300 includes the original volume 310, the copy volume 320 for always storing the full copy of the original volume 310, and the snapshot volume 330 for storing the snapshot of the data written in the original volume 310, the volume of the designated generation can be obtained as in the first embodiment. Thus, it is possible to store the backup of the designated generation in the storage system, and to access and back up the data of the designated generation without using a tape library of a slow communication speed while a storage capacity is kept low. Especially, since a data backup of the original volume is provided in real time, data is quickly restored even when interference occurs in the disk devices.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
a disk device which comprises:
an original volume for storing data which is read/written by a host;
a copy volume for storing a copy of the original volume at a predetermined timing; and
a snapshot volume for storing a snapshot data which is a snapshot of the original volume; and
a storage control unit which comprises:
a management unit for managing the storage control unit;
a channel I/F that is connected to the host; and
a device I/F that is connected to the disk device,
wherein the management unit: copies data of the original volume to the copy volume at a predetermined timing;
stores the snapshot data in the snapshot volume corresponding to a write request to the original volume;
manages a generation of the stored snapshot according to predetermined copy volume blocks and snapshot volume blocks, and manages a generation of the copy volume; and
reads data from the snapshot volume and/or the copy volume when a read request to a volume of a generation different from that of the original volume is received from the host.

2. The storage system according to claim 1, wherein:
upon reception of an access request to the volume of the generation different from that of the original volume;
the management unit:
instructs access to the copy volume when the designated generation is the same as that of the copy volume;
designates a block address storing data of the designated generation in the snapshot volume and the copy volume when the designated generation is different from that of the copy volume; and
accesses the designated generation volume.

3. The storage system according to claim 2, wherein:
when the designated generation is the same as that of the original volume and a write request to the original volume is received after a snapshot request,
the management unit;
synchronizes data of the original volume with those of the copy volume;
splits the synchronization of the data after completion of the synchronization;
designates the block address storing the data of the designated generation in the snapshot volume and the copy volume; and
accesses the designated generation volume.

4. The storage system according to claim 1, wherein the management unit stores a copy of the data, which has been stored to the original volume before the snapshot request, to the copy volume.

5. The storage system according to claim 1, wherein when the write request to original volume is received, the management unit stores the writing data in the copy volume.

6. A method of managing volumes in a storage system, the storage system comprising: a disk device which comprises: an original volume for storing data which is read/written by a host; a copy volume for storing a copy of the original volume at a predetermined timing; and a snapshot volume for storing a snapshot data which is a snapshot of the original volume; and a storage control unit which comprises: a management unit for managing the storage control unit; a channel I/F that is connected to the host; and a device I/F that is connected to the disk device, the method, which is performed by the management unit, comprising the steps of:

copying data of the original volume to the copy volume at a predetermined timing;

storing the snapshot data in the snapshot volume corresponding to a write request to the original volume; and managing a virtual volume of the stored snapshot by the copy volume and the snapshot volume, where the snapshot volume is managed according to predetermined copy volume blocks and snapshot volume blocks.

7. The method of managing volumes according to claim 6, further comprising the steps of:

when a read request to a volume of a generation different from that of the original volume is received from the host, reading data from the snapshot volume and/or the copy volume;

creating the requested generation volume; and managing the virtual volume of the snapshot.

8. The method of managing volumes according to claim 7, further comprising the steps of:

upon reception of an access request to the volume of the generation different from that of the original volume, instructing access to the copy volume when the designated generation is the same as that of the copy volume;

designating a block address storing data of the designated generation in the snapshot volume and the copy volume when the designated generation is different from that of the copy volume;

accessing the designated generation volume; and managing the virtual volume of the snapshot.

9. The method of managing volumes according to claim 8, further comprising the steps of:

when the designated generation is the same as that of the original volume and a write request to the original volume is received after a snapshot request, synchronizing data of the original volume with those of the copy volume, splitting the synchronization of the data after completion of the synchronization;

designating the block address storing the data of the designated generation in the snapshot volume and the copy volume;

accessing the designated generation volume; and managing the virtual volume of the snapshot.

10. The method of managing volumes according to claim 6, further comprising the steps of:

receiving restore request of the designated generation original volume from the host;

copying a block of the snapshot volume storing data of the designated generation to the copy volume; and changing the copied copy volume to the original volume.

11. The method of managing volumes according to claim 6, further comprising the steps of:

obtaining a total use capacity of the snapshot volume when the snapshot volume writes a data;

searching for a generation of lowest priority among data stored in the snapshot volume when the obtained total use capacity exceeds a predetermined threshold;

copying data of the searched generation to a backup device; and deleting information of the copied generation.

12. A program for managing volumes, which is used in a storage system comprising: a disk device which comprises: an original volume for storing data which is read/written by a host; a copy volume for storing a copy of the original volume at a predetermined timing; and a snapshot volume for storing a snapshot data which is a snapshot of the original volume; and a storage control unit which comprises: a management unit for managing the storage control unit; a channel I/F that is connected to the host; and a device I/F that is connected to the disk device, the program controlling the management unit to execute the procedures of:

copying data of the original volume to the copy volume at a predetermined timing;

storing the snapshot data in the snapshot volume corresponding to a write request to the original volume; and managing the snapshot by the copy volume and the snapshot volume, where the snapshot volume is managed according to predetermined copy volume blocks and snapshot volume blocks.

13. The program according to claim 12, further controlling the management unit to execute the procedure of:

reading data from the snapshot volume and/or the copy volume when a read request to a volume of a generation different from that of the original volume is received from the host.

14. The program according to claim 13, further controlling the management unit to execute the procedures of:

upon reception of an access request to the volume of the generation different from that of the original volume, instructing access to the copy volume when the designated generation is the same as that of the copy volume; and designating a block address storing data of the designated generation in the snapshot volume and the copy volume when the designated generation is different from that of the copy volume.

15. The program according to claim 14, further controlling the management unit to execute the procedures of:

when designated generation is the same as that of the original volume; and a write request to the original volume is received after a snapshot request, synchronizing data of the original volume with those of the copy volume;

splitting the synchronization of the data after completion of the synchronization; and designating the block address storing the data of the designated generation in the snapshot volume and the copy volume.

* * * * *